United States Patent
Kuenemund et al.

(10) Patent No.: US 9,806,881 B2
(45) Date of Patent: Oct. 31, 2017

(54) CRYPTOGRAPHIC PROCESSOR, METHOD FOR IMPLEMENTING A CRYPTOGRAPHIC PROCESSOR AND KEY GENERATION CIRCUIT

(71) Applicant: Infineon Technologies AG, Neubiberg (DE)

(72) Inventors: Thomas Kuenemund, Munich (DE); Berndt Gammel, Markt Schwaben (DE); Franz Klug, Aying (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/316,833

(22) Filed: Jun. 27, 2014

(65) Prior Publication Data

US 2015/0381351 A1 Dec. 31, 2015

(51) Int. Cl.
- G06F 21/00 (2013.01)
- H04L 9/06 (2006.01)
- H04L 9/00 (2006.01)
- G06F 21/72 (2013.01)

(52) U.S. Cl.
CPC ............ *H04L 9/0618* (2013.01); *G06F 21/72* (2013.01); *H04L 9/003* (2013.01); *H04L 9/0643* (2013.01); *H04L 2209/046* (2013.01)

(58) Field of Classification Search
CPC ................................. G06F 21/72; G06F 21/10
USPC ....................................................... 713/189
See application file for complete search history.

(56) References Cited

U.S. PATENT DOCUMENTS

| | | | |
|---|---|---|---|
| 6,774,413 B2 | 8/2004 | Baukus et al. | |
| 8,111,089 B2 | 2/2012 | Cocchi et al. | |
| 8,151,235 B2 | 4/2012 | Chow et al. | |
| 2012/0098350 A1* | 4/2012 | Campanella | B60L 3/0069 307/104 |
| 2012/0210138 A1* | 8/2012 | Tucker | G06F 21/558 713/189 |
| 2014/0055653 A1* | 2/2014 | Nishihara | H04N 5/3745 348/300 |

(Continued)

OTHER PUBLICATIONS

Rostami, M. and Koushanfar, F. and Rajendran, Jeyavijayan and Karri, Ramesh: Hardware security: Threat models and metrics. 2013 IEEE/ACM International Conference on Computer-Aided Design (ICCAD), Nov. 18-21, 2013, San Jose, CA, USA, pp. 819-823. DOI: 10.1109/ICCAD.2013.6691207.

(Continued)

*Primary Examiner* — Anthony Brown
(74) *Attorney, Agent, or Firm* — Viering, Jentschura & Partner mbB

(57) ABSTRACT

A cryptographic processor is described comprising a processing circuit configured to perform a round function of an iterated cryptographic algorithm, a controller configured to control the processing circuit to apply a plurality of iterations of the round function on a message to process the message in accordance with the iterated cryptographic algorithm and a transformation circuit configured to transform the input of a second iteration of the round function following a first iteration of the round function of the plurality of iterations and to supply the transformed input as input to the second iteration wherein the transformation circuit is implemented using a circuit camouflage technique.

24 Claims, 18 Drawing Sheets

(56) References Cited

U.S. PATENT DOCUMENTS

2015/0071434 A1* 3/2015 Thacker, III ....... G03G 15/0863 380/30

OTHER PUBLICATIONS

Rajendran, Jeyavijayan and Pino, Youngok and Sinanoglu, Ozgur and Karri, Ramesh: Logic Encryption: A Fault Analysis Perspective. Proceedings of the Design, Automation & Test in Europe Conference & Exhibition (Date), 2012. Mar. 12-16, 2012, Dresden, Germany, pp. 953-958. DOI: 10.1109/DATE.2012.6176634.

Rajendran, Jeyavijayan and Pino, Youngok and Sinanoglu, Ozgur and Karri, Ramesh: Security Analysis of Logic Obfuscation, Proceedings of the 49th Annual Design Automation Conference, DAC '12, 2012. San Francisco, California, pp. 83-89. ACM, New York, NY, USA. DOI: 10.1145/2228360.2228377.

Rajendran, Jeyavijayan and Sinanoglu, Ozgur and Karri, Ramesh: Is split manufacturing secure?, Proceedings of the Design, Automation & Test in Europe Conference & Exhibition (Date), 2013. Mar. 18-22, 2013, Grenoble, France, pp. 1259-1264. DOI: 10.7873/DATE.2013.261.

Rajendran, Jeyavijayan and Sam, Michael and Sinanoglu, Ozgur and Karri, Ramesh: Security Analysis of Integrated Circuit Camouflaging. Proceedings of the 2013 ACM SIGSAC Conference on Computer & Communications Security, CCS'13, Berlin, Germany, pp. 709-720. DOI: 10.1145/2508859.2516656.

Syphermedia International Inc.: SypherMedia Library™ Circuit Camouflage Technology. White paper version 1.9.8.j, Mar. 2012 & data sheet.

Sinanoglu, Ozgur and Karimi, N. and Rajendran, Jeyavijayan and Karri, Ramesh and Jin, Y. and Huang, K. and Makris, Y.: Reconciling the IC test and security dichotomy, 18th IEEE European Test Symposium (ETS), 2013, pp. 1-6. IEEE, 2013. DOI: 10.1109/ETS.2013.6569368.

Torrance, Randy and Dick, James: The State-of-the-Art in IC Reverse Engineering. In: Proceedings of the 11th International Workshop on Cryptographic Hardware and Embedded Systems, CHES 2009. Clavier, Christophe and Gaj, Kris (Eds.). Lausanne, Switzerland, Sep. 6-9, 2009. LNCS 5747, Springer Verlag, 2009. DOI: 10.1007/978-3-642-04138-9_26.

Torrance, Randy and Dick, James: The State-of-the-Art in Semiconductor Reverse Engineering. Proceedings of the 48th Design Automation Conference, DAC'11. Stok, Leon and Dutt, Nikil and Hassoun, Soha (Eds.). San Diego, California, USA, pp. 333-338. DOI: 10.1145/2024724.2024805.

* cited by examiner

CRYPTOGRAPHIC PROCESSOR, METHOD FOR IMPLEMENTING A CRYPTOGRAPHIC PROCESSOR AND KEY GENERATION CIRCUIT

TECHNICAL FIELD

The present disclosure relates to cryptographic processors, methods for implementing a cryptographic processor and key generation circuits.

BACKGROUND

Reverse Engineering (RE) of integrated circuits (ICs) can be considered as one of the most serious threats to semiconductor industry, since it may be misused by an attacker to steal and/or pirate a circuit design. An attacker who successfully reverse engineers an integrated circuit can fabricate and sell a similar, i.e. cloned circuit, and illegally sell and reveal the design.

Therefore concepts and techniques that thwart reverse engineering of integrated circuits are desirable.

SUMMARY

According to one embodiment, a cryptographic processor is provided including a processing circuit configured to perform a round function of an iterated cryptographic algorithm, a controller configured to control the processing circuit to apply a plurality of iterations of the round function on a message to process the message in accordance with the iterated cryptographic algorithm and a transformation circuit configured to transform the input of a second iteration of the round function following a first iteration of the round function of the plurality of iterations and to supply the transformed input as input to the second iteration wherein the transformation circuit is implemented using a circuit camouflage technique.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Reverse engineering can be hindered by deploying camouflage circuits. Camouflage circuit technologies are practically efficient means to hinder reverse engineering of (electronic) circuits. Generally, camouflage can be used to hide logical functions and secret values, and thus prevent reverse engineering. An important application is the protection of proprietary cryptographic algorithms employed in proprietary protocols for authentication, encryption, or integrity protection (e.g. MAC (Message Authentication Code)). It is typically less useful to employ camouflage implementation techniques for known or standardized algorithms, since the attacker (i.e. the reverse engineer) could replace the whole circuit block of the algorithm by some off-the-shelf implementation, as soon as he has identified its functionality.

Thus a proprietary cryptographic algorithm implemented using camouflage implementation techniques is typically desirable.

However, the development of cryptographically sound algorithms takes a long time and usually requires extensive reviewing by a larger group of cryptographers. Hence one would like to use an established field-proven algorithm and tweak it. However, creating a proprietary cipher by modifying, e.g. S-boxes or other intrinsic structures of the original cipher can be dangerous since it might lead to unexpected cryptographic security holes. Usually all previous cryptanalysis results are futile.

Even if a cryptographically secure tweak can be found, there is the problem that the side-channel countermeasures developed for the original cipher may not work anymore. There may also be the situation that a solid implementation of the cipher is available and one cannot spend the efforts for developing an implementation of the tweak from the scratch for costs or time reasons.

According to one embodiment, a camouflage circuit technology is used to efficiently protect a cryptographic algorithm, e.g. a block cipher, and the involved secrets.

Figure 1:
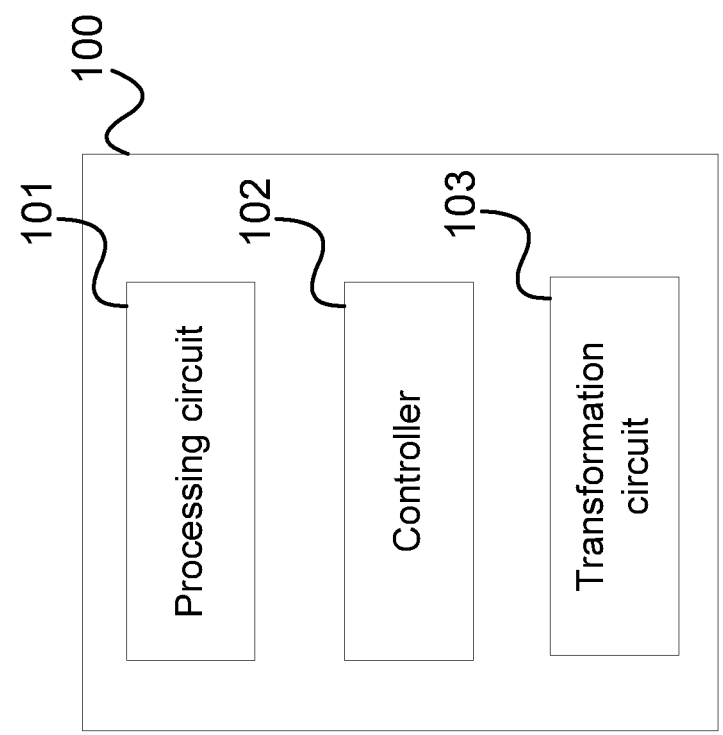
FIG. 1 shows a cryptographic processor according to an embodiment.

FIG. 1 shows a cryptographic processor 100 according to an embodiment.

The cryptographic processor 100 includes a processing circuit 101 configured to perform a round function of an iterated cryptographic algorithm.

The cryptographic processor 100 further includes a controller 102 configured to control the processing circuit to apply a plurality of iterations of the round function on a message to process the message (e.g. to decrypt or encrypt the message or to compute a hash value of the message) in accordance with the iterated cryptographic algorithm.

Further, the cryptographic processor 100 includes a transformation circuit 103 configured to transform the input of a second iteration of the round function following a first iteration of the round function of the plurality of iterations and to supply the transformed input as input to the second iteration.

The transformation circuit 103 is implemented using a circuit camouflage technique.

According to one embodiment, in other words, one or more transformations are added to an encryption or decryption processing block wherein the one or more transformations are implemented using a circuit camouflage technique.

According to one embodiment, the iterated cryptographic algorithm is an iterated encryption algorithm or an iterated decryption algorithm.

The iterated cryptographic algorithm is for example an iterated block cipher algorithm for encryption or decryption.

The iterated cryptographic algorithm is for example an iterated hash construction, like the Merkle-Damgard or the Sponge construction.

The input of the second iteration is for example an intermediate state of a message processed by the first iteration (e.g. partially encrypted or decrypted by the first iteration or a partially computed hash value for the message).

The input of the second iteration may also be a cryptographic key for encrypting or decrypting a message.

According to one embodiment, the transformation circuit is configured to transform the input of each of a plurality of iterations of the round function following the first iteration and to supply the transformed input as input to the second iteration.

According to one embodiment, the transformation circuit being implemented using a circuit camouflage technique includes or may be understood as the transformation circuit being implemented to include at least one circuit structure with a hidden logic function.

According to one embodiment, the transformation circuit being implemented using a circuit camouflage technique includes or may be understood as the transformation circuit being implemented to include circuit structures to hamper reverse engineering of the transformation circuit.

According to one embodiment, the transformation circuit being implemented using a circuit camouflage technique includes or may be understood as the transformation circuit being implemented to include at least one dummy circuit structure.

For example, the transformation of the input of the second iteration is independent from the logic state of the dummy circuit structure.

According to one embodiment, the transformation circuit being implemented using a circuit camouflage technique includes or may be understood as the transformation circuit being implemented to include a circuit structure which includes one or more switching elements but has an output with a logic value that is independent from the input of the second iteration.

According to one embodiment, the transformation circuit being implemented using a circuit camouflage technique includes or may be understood as the transformation circuit being implemented to include a field effect transistor which is configured to have a constant switch state. For example, a NMOS or PMOS transistor may have a channel implant such that it is permanently in a conductive state or permanently in a non-conductive state.

According to one embodiment, the transformation circuit being implemented using a circuit camouflage technique includes or may be understood as the transformation circuit being implemented to include a hidden connection in a diffusion layer or a polysilicon layer.

According to one embodiment, the transformation circuit being implemented using a circuit camouflage technique includes or may be understood as the transformation circuit being implemented to include cells with different logic functions but similar layout. For example, a library may be used which includes cells of similar layout to confuse automatic pattern recognition systems.

According to one embodiment, the transformation circuit being implemented using a circuit camouflage technique includes or may be understood as forming a circuit structure of the transformation circuit by forming two field effect transistors; connecting the field effect transistors such that an output signal of the digital circuit in response to a predetermined input signal has an undefined logic state when the threshold voltages of the field effect transistors are equal and setting the threshold voltages of at least one of the field effect transistors such that the output signal of the digital circuit in response to the predetermined input signal has a predetermined defined logic state. In other words, according to one embodiment, a metastable state of a circuit in the transformation circuit is shifted to a predefined stable state by setting the threshold voltages of two transistors of the circuit accordingly. The threshold voltage may for example be set by a certain doping of a region (e.g. a channel region) of the field effect transistor. For example, the two field effect transistors may be differently doped. For example, the transformation circuit is implemented to include an ICBC-X circuit as described further below.

According to one embodiment, the transformation circuit being implemented using a circuit camouflage technique includes or may be understood as the transformation circuit being implemented to include a sub-circuit including at least one p channel field effect transistor; at least one n channel field effect transistor; a first power supply terminal configured to receive a first supply voltage with an upper supply potential and a second power supply terminal configured to receive a second supply voltage with a lower supply potential; wherein the at least one p channel field effect transistor and the at least one n channel field effect transistor are connected such that the at least one n channel field effect transistor, if supplied with the upper supply potential at its gate, supplies the lower supply potential to the gate of the at least one p channel field effect transistor and the at least one p channel field effect transistor, if supplied with the lower supply potential at its gate, supplies the upper supply potential to the gate of the at least one n channel field effect transistor; wherein the sub-circuit is configured such that the logic state of the gate of the at least one p channel field effect transistor and the logic state of the gate of the at least one n channel field effect transistor can only be changed by changing a supply of at least one of the first supply voltage and the second supply voltage to the sub-circuit and a connection coupled to the gate of the at least one p channel field effect transistor or the gate of the at least one n channel field effect transistor and a further component of the transformation circuit. According to one embodiment, in other words, a circuit is provided on a semiconductor chip with two cross-coupled transistors which switch themselves on, wherein the potential of at least one of the cross-couplings is output from the circuit and supplied to further components of the semiconductor chip. One or more such circuits may be provided in the semiconductor chip to make reverse engineering more difficult. According to one embodiment, in other words, a TIE-Cell approach for IC camouflaging is used (which is also referred to as TIE-Cell camouflage concept or approach) which can be seen to be based on HC-TIE FILLER cells.)

According to one embodiment, the transformation circuit being implemented using a circuit camouflage technique includes or may be understood as the transformation circuit being implemented to include a sub-circuit including a plurality of supply lines delimiting a plurality of cell areas and a gate including a first transistor and a second transistor, wherein the first transistor is located in a first cell area of the plurality of cell areas and the second transistor is located in a second cell area of the plurality of cell areas such that a supply line of the plurality of supply lines lies between the first cell area and the second cell area. In other words, a logic gate is distributed or split over a plurality of cell areas. Thus, an attacker searching for the logic gate, e.g. identifying gates (or cells) by pattern recognition, cannot find the gate if he is searching only within one cell area but needs to consider a plurality of cell areas. For example, instead of searching for pattern within one cell area, an attacker needs to take into account that parts of the pattern may be located in neighboring cell areas.

Figure 2:
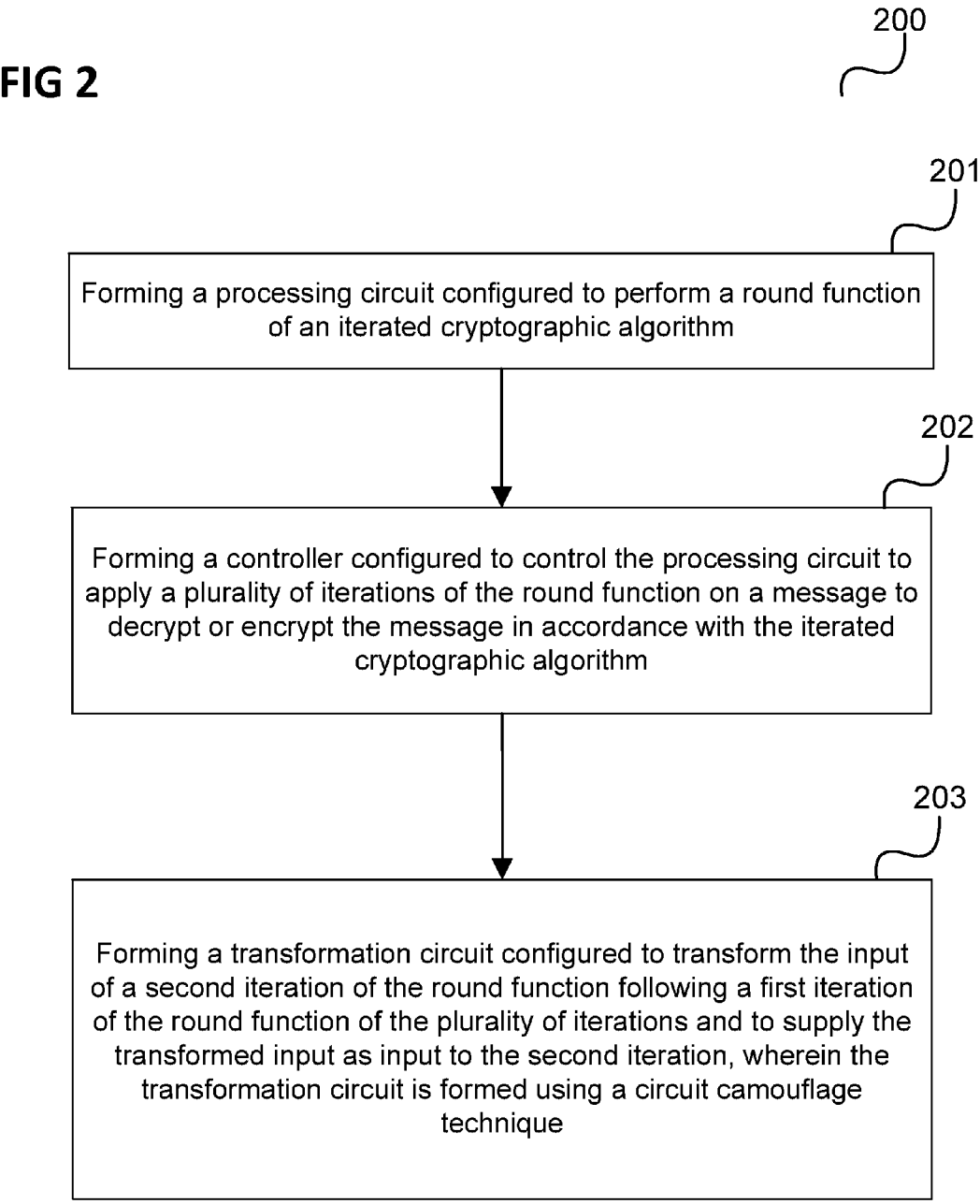
FIG. 2 shows a flow diagram illustrating a method for implementing a cryptographic processor according to an embodiment.

According to one embodiment, a method for implementing a cryptographic processor is provided as illustrated in FIG. 2.

FIG. 2 shows a flow diagram 200 according to an embodiment.

In 201, a processing circuit 201 configured to perform a round function of an iterated cryptographic algorithm is formed.

In 202, a controller configured to control the processing circuit to apply a plurality of iterations of the round function on a message to process the message in accordance with the iterated cryptographic algorithm is formed.

In 203, a transformation circuit configured to transform the input of a second iteration of the round function following a first iteration of the round function of the plurality of iterations and to supply the transformed input as input to the second iteration is formed, wherein the transformation circuit is formed using a circuit camouflage technique.

In the following, embodiments are described in more detail.

The following embodiments are described in the context of a block cipher. Block ciphers may be hardened by a key-whitening technique. This may for example be applied to the standardized DES (data encryption standard) cryptographic algorithm to harden it against brute force attacks. The resulting algorithm is called DESX. The whitening technique can be applied to any block cipher ENC(K, m) to create a new algorithm ENC*(K*, m) with increased key length:

$$c=ENC^*(K^*;m)=K_{W2} \oplus ENC(K;m \oplus K_{w1})$$
$$\text{with } K^*=(K,K_{W1},K_{w2})$$
(1)

with the message m to be encrypted, the encrypted message c and cryptographic keys K, $K_{W1}$, $K_{W2}$.

This may be generalized to $$c=W_2(K_{w2},ENC(K;W_1(K_{W1},m))),$$
(2)

with whitening functions $W_1$, $W_2$ which are bijective. The inverse functions $W_1^{-1}$, $W_2^{-1}$ are needed for decryption. Additionally, the key K may be generated from a blinding applied to a key $K_0$ and transforming it by $$K=W_3(K_{W3},K_0)$$
(3)

To avoid a loss of key entropy the function $W_3$ is preferably also bijective. Such an augmentation of a block cipher by functions $W_1$, $W_2$, $W_3$ is illustrated in FIG. 3.

Figure 3:
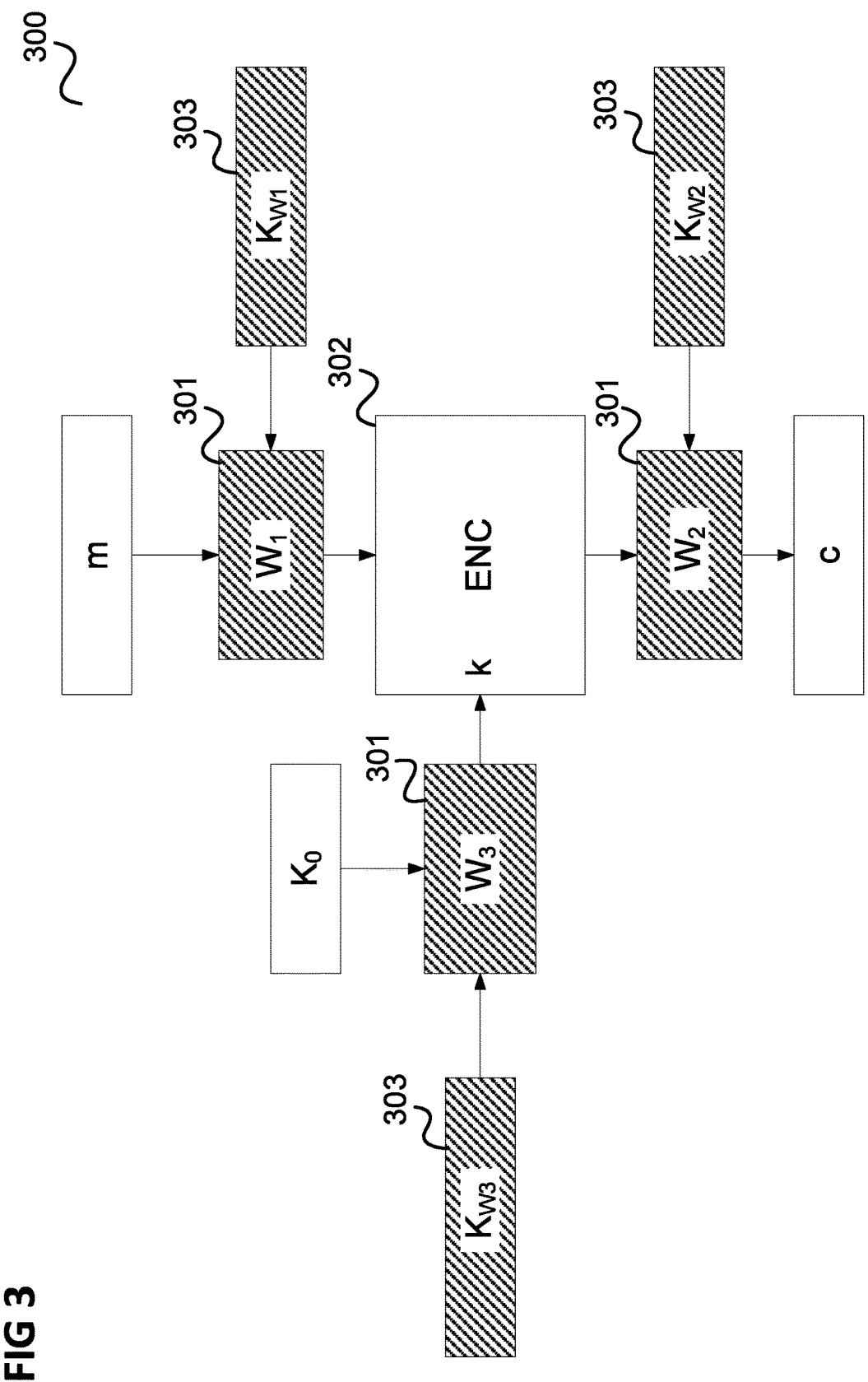
FIG. 3 illustrates how a block cipher can be augmented to create a new algorithm.

FIG. 3 illustrates how a block cipher can be augmented to create a new algorithm.

In the following the new augmented algorithm is referred to as a proprietary cipher.

As given by equation (2), additional functions 301, referred to as $W_1$, $W_2$, $W_3$ are added that transform the message m, the encryption key $K_0$ and the output of an encryption block 302 (ENC), respectively, wherein the encryption block generates its output by encrypting the transformed message and the transformed key.

The additional functions 301 perform their respective transformations based on respective additional keys 303, referred to as $K_{W1}$, $K_{W2}$, $K_{W3}$.

Some or all of the additional functions 301 and the additional keys 303 may be implemented using a circuit camouflage technique such that their implementation is hard to reverse engineer. Implementing a key using a circuit camouflage technique may for example be understood as implementing a circuit storing the key using a circuit camouflage technique. The additional keys 303 may be implemented as fixed values and the additional functions 301 can be implemented as fixed, key-independent transformations.

The approach illustrated in FIG. 3 allows that the algorithm of the proprietary cipher cannot (easily) be deduced by observing input and output of the cipher or even by choosing the plaintext. Further, only a part of the proprietary cipher needs to be implemented using circuit camouflage techniques (e.g. some or all of the additional functions 301). This allows saving circuit area and power consumption compared to a complete implementation using circuit camouflage techniques.

The cryptographic security of the proprietary cipher is at least as good as the original cipher ENC, e.g., with respect to linear, differential or algebraic cryptanalysis. The cipher may even be hardened against brute force attack since the key size can be increased (by suitable selection of $W_3$ and $K_{W3}$).

Further, the risk that additional side-channel leakage is introduced by the augmentation which might be exploited by side channel attacks (such as DPA (Differential Power Analysis), SPA (Simple Power Analysis), DEMA (Differential Electromagnetic Analysis), SEMA (Simple Electromagnetic Analysis), DFA (Differential Fault Analysis), etc.) is low. Namely, if the core algorithm ENC is implemented in a side-channel resistant way (which may include employing special circuit techniques not easily compatible with camouflage techniques), the proprietary algorithm inherits this property, provided that the functions $W_1$, $W_2$, $W_3$, do not directly leak the keys.

In the following, an embodiment is described which can be seen to be augmented with one or more transformation functions within the encryption block ENC. Specifically, in the following embodiment, a block cipher implemented with a round structure is augmented by one or more transformations.

Figure 4:
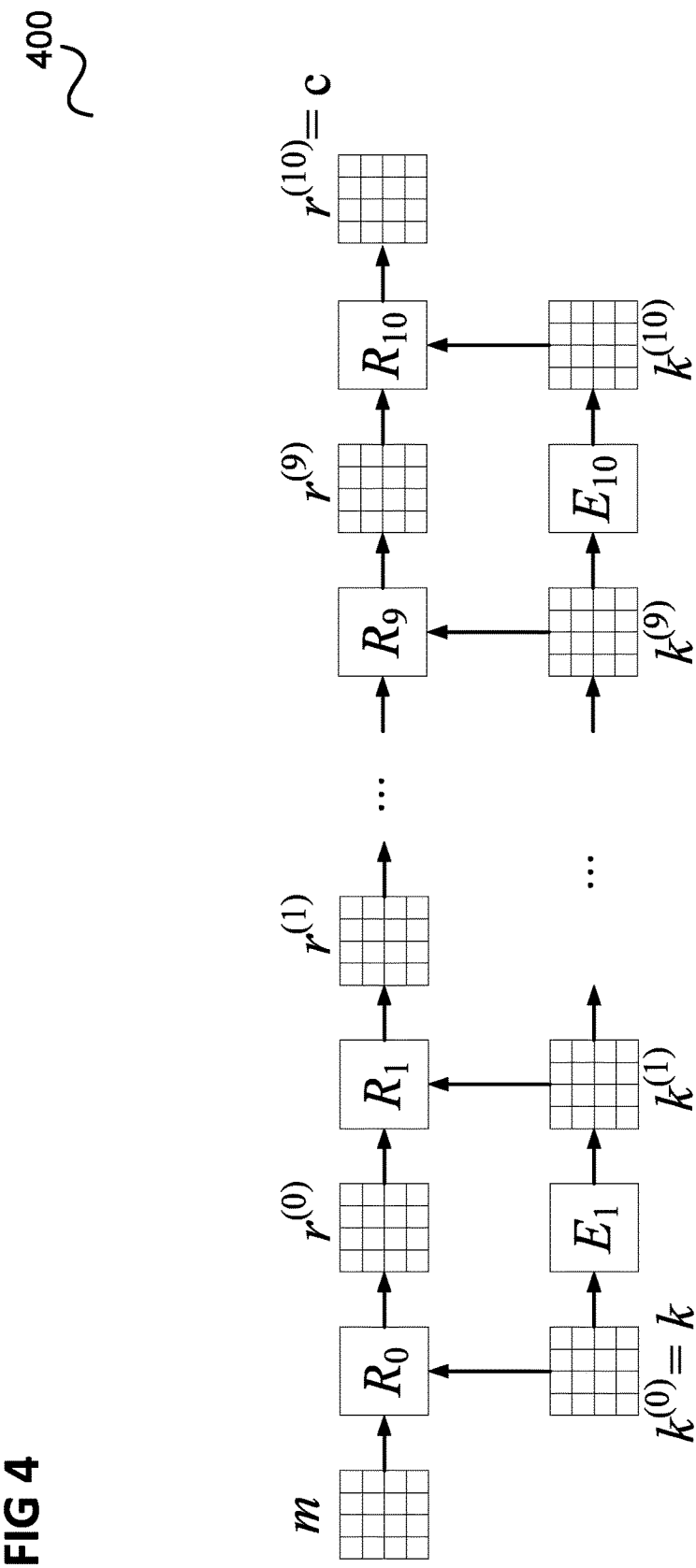
FIG. 4 shows the round structure of an iterated block cipher.

FIG. 4 shows the round structure of an iterated block cipher.

This example shows the AES-128 (advanced encryption standard with 128 bit long key).

The input to the block cipher is the message m to be encrypted and the key k.

Key expansion functions $E_j$ generate a sequence of round keys $k^{(j)}$ wherein ($k^{(0)}$=k and $0 \leq j \leq 10$).

Each round key is supplied to a respective round function $R_j$. Each round function $R_j$ processes its input according to the of round keys $k^{(j)}$ to generate an output $r^{(j)}$ wherein the input to $R_0$ is the message m and the input to $R_j$ for j>0 is the output $r^{(j-1)}$ of the previous round function $R_{j-1}$. The output of the $10^{th}$ round function $R_{10}$ is the encrypted message $c=r^{(10)}$.

The keys $k_j$, the message m and the outputs $r^{(j)}$ (which for example correspond to state matrices of the algorithm) are indicated by 4×4 grids to illustrate the 4×4=16 byte=128 bit data size of the AES.

The security model of block ciphers is usually based on the assumption that the round keys $k_j$ are random (i.e. have independent and equally distributed values). The functions $E_j$ and $R_j$ are typically highly critical with respect to modifications. They are for example carefully selected to meet the cryptographic requirements and their implementation is done in a special way to thwart side-channel attacks. Hence they should not be changed them to obtain a proprietary cipher. Usually it is also difficult to replace them using camouflage circuit technology, because this cannot be easily combined with side-channel resistance requirements (for area, power reasons, or simply because a solid field-proven implementation of these blocks is available).

According to one embodiment, the generation process of the round keys is augmented which can be seen to be based on the consideration that the round keys need to be only independently and equally distributed values. However, in view of the above, this is done outside the security critical functions $E_j$. This is illustrated in FIG. 5.

Figure 5:
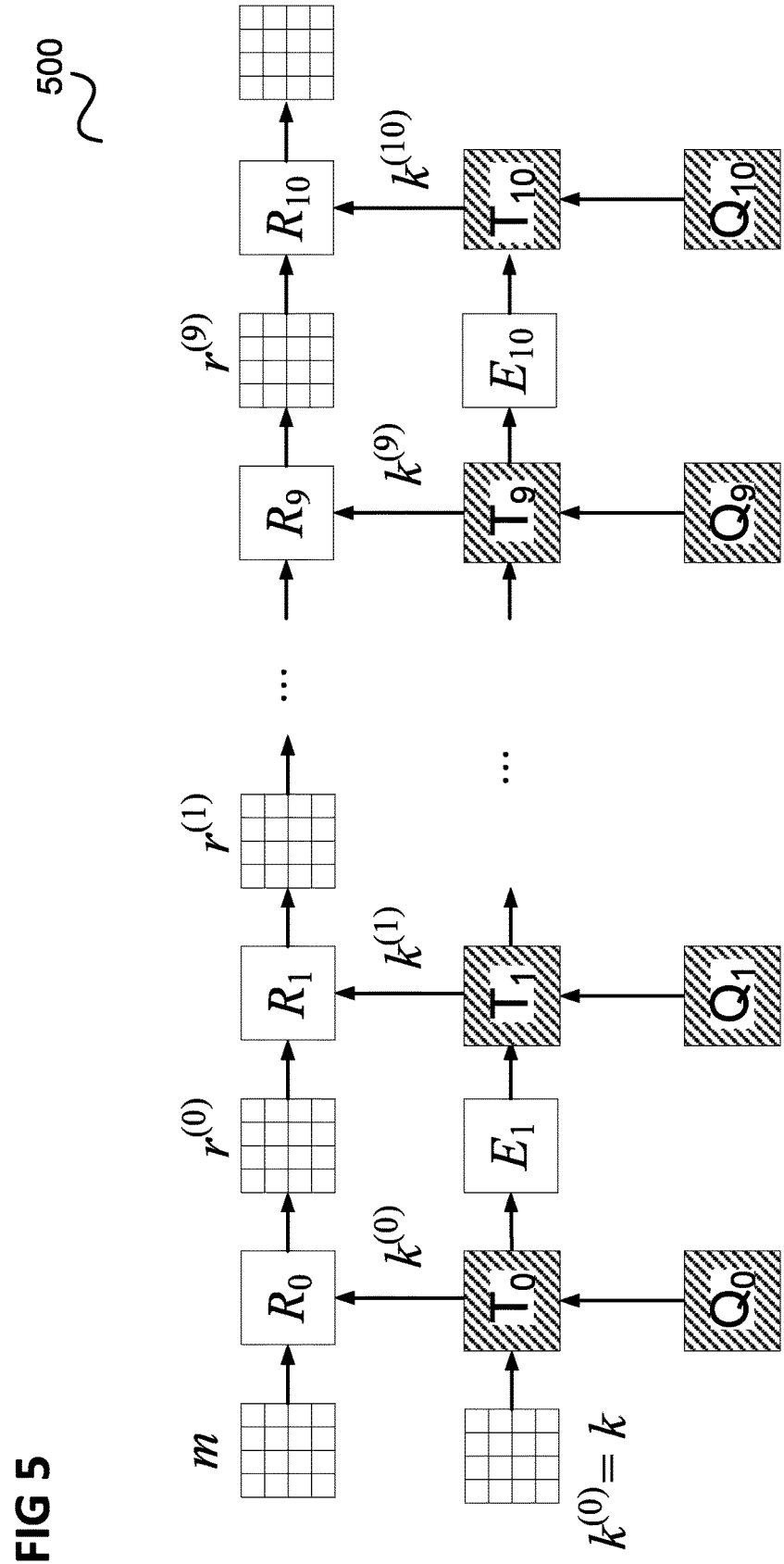
FIG. 5 shows the round structure of a camouflage protected proprietary cipher with augmented key scheduling according to an embodiment.

FIG. 5 shows the round structure of a camouflage protected proprietary cipher with augmented key scheduling according to an embodiment.

The example of FIG. 5 is based on the structure of FIG. 4. Accordingly, it includes round functions $R_j$ and key expansion functions $E_j$ operating as described above with reference to FIG. 4 ($0 \leq j \leq 10$).

However, the structure is augmented by transformation functions $T_j$ ($0 \leq j \leq 10$) wherein the transformation function $T_j$ generates the round key $k_j$ and provides it to the round function $R_j$ based on its internal state and based on the output of the expansion function $E_j$ (except for $T_0$ which generates $k^{(0)}$ based on the input key k; $k^{(0)}$ may as in the example of FIG. 4 be equal to k). The expansion function $E_j$ receives a chaining value from the preceding transformation function $T_{j-1}$ based on which it generates its output. The chaining value may for example be $k^{(j-1)}$ or it may be the untransformed (in other words original) round key $T_{j-1}^{-1}(k^{(j-1)})$ i.e. the same round key input to $E_j$ as in the structure of FIG. 4.

The transformation functions $T_j$ may depend on an additional key $Q_j$. The keys $Q_j$ ($0 \leq j \leq 10$) may however also be constant such that the transformation functions $T_j$ are constant. The keys $Q_j$ could for example be changed from product to product.

The additional blocks $T_j$ and $Q_j$ ($0 \leq j \leq 10$) can be seen to make the block cipher proprietary. According to one embodiment, these blocks (or at least a subset of these blocks) are implemented using a circuit camouflage technique which hinders reverse engineering of these blocks. Each original round key, as generated by $E_j$ is transformed by an additional function $T_j$ which has as input a previous value, an additional key $Q_j$, an internal state, and as output a round key $k^{(j)}$ and a chaining value used as input for the next round key function $E_{j+1}$.

Similarly to the additional transformation functions $T_j$ before the expansion functions $E_j$ additional transformation functions may be placed before the rounding functions $R_j$. This is illustrated in FIG. 6.

Figure 6:
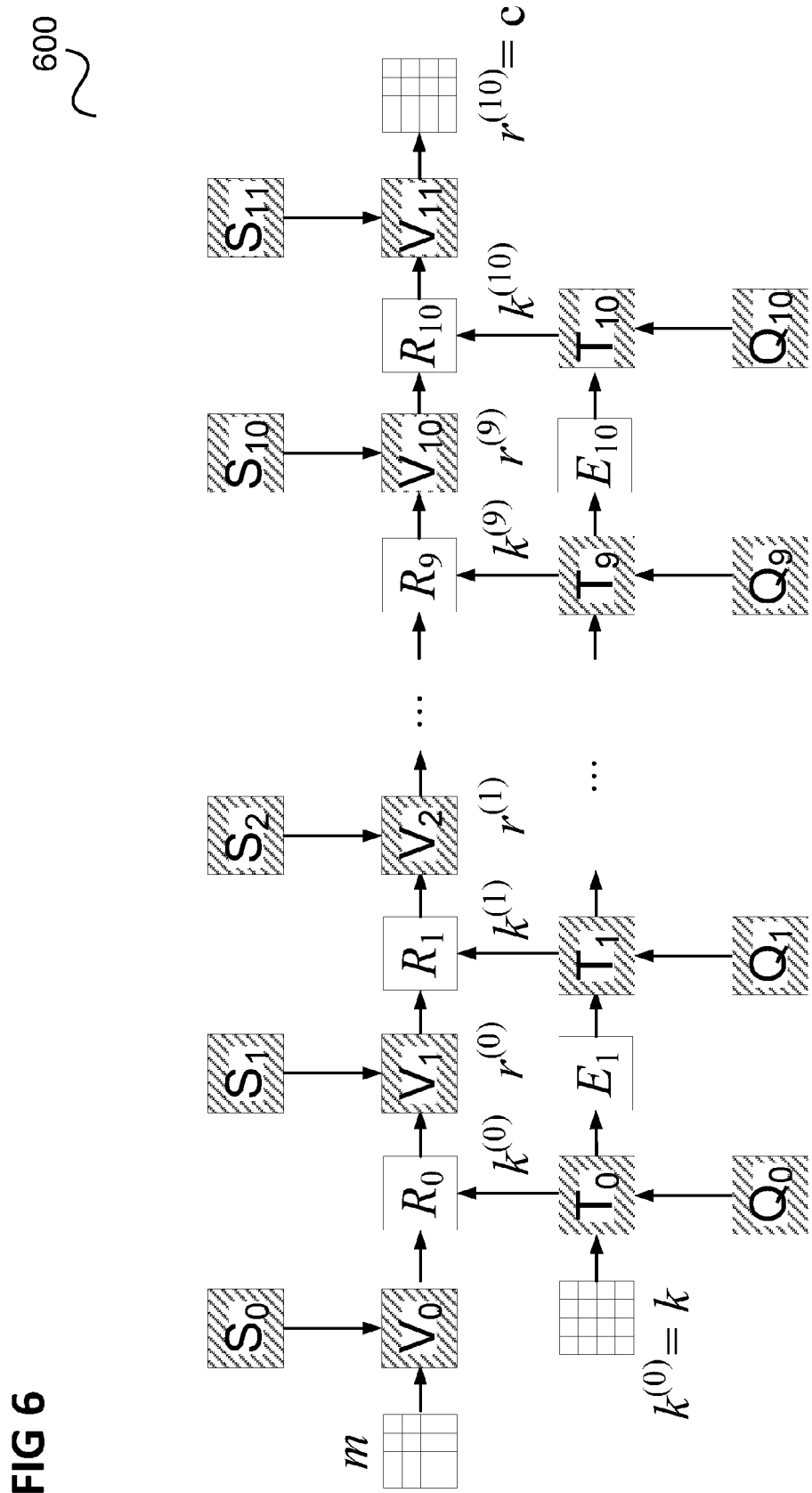
FIG. 6 shows the round structure of a camouflage protected proprietary cipher with augmented key scheduling and augmented round scheduling according to an embodiment.

FIG. 6 shows the round structure of a camouflage protected proprietary cipher with augmented key scheduling and augmented round scheduling according to an embodiment.

The example of FIG. 6 is based on the structure of FIG. 5. Accordingly, it includes round functions $R_j$ key expansion functions $E_j$, additional transformation functions $T_j$ and additional key $Q_j$ operating as described above with reference to FIG. 5 ($0 \leq j \leq 10$).

The block cipher structure is further augmented by additional augmentation functions $V_j$ ($0 \leq j \leq 10$) wherein $V_j$ is placed before $R_j$ and transforms the output of the preceding round function $R_{j-1}$ (except for $V_0$ which transforms the input message m) and supplies the result of the transformation to $R_j$. Each round function $R_j$ operates on this input from $V_j$. Additionally, there is an additional augmentation function $V_{11}$ placed after $R_{10}$. which outputs the encrypted message c.

Each augmentation function $V_j$ ($0 \leq j \leq 11$) may perform its operation based on an additional key $S_j$. The keys $S_j$ may be constant (such that in effect, the augmentation functions $V_j$ may be implemented as constant, key-independent functions) or may for example be changed from product to product.

The blocks $V_j$ and $S_j$ may also be implemented using a circuit camouflage technique which hinders reverse engineering of these blocks.

The approach illustrated in FIGS. 4 and 5 provides a proprietary cipher whose algorithm cannot be (easily) deduced by observing input and output of the cipher, or even by choosing the plaintext. Only a part of the proprietary cipher needs to be implemented using circuit camouflage techniques. Compared to camouflaging the complete cryptographic circuit (i.e. the circuit implementing the block cipher) this allows saving circuit area and power consumption.

The cryptographic security of the proprietary cipher according to the approach illustrated in FIGS. 4 and 5 is at least as good as the original cipher (illustrated in FIG. 4), e.g. with respect to linear, differential or algebraic cryptanalysis. The cipher is typically even hardened. Further, the risk that an additional and exploitable side-channel leakage is introduced is minimized. If the core algorithm (as illustrated in FIG. 4) is implemented in a side-channel resistant way (e.g. employing special circuit techniques not easily compatible with camouflage techniques), the proprietary algorithm inherits this property, provided, that the additional functions $T_j$, $V_j$ do not directly leak keys.

Figure 7:
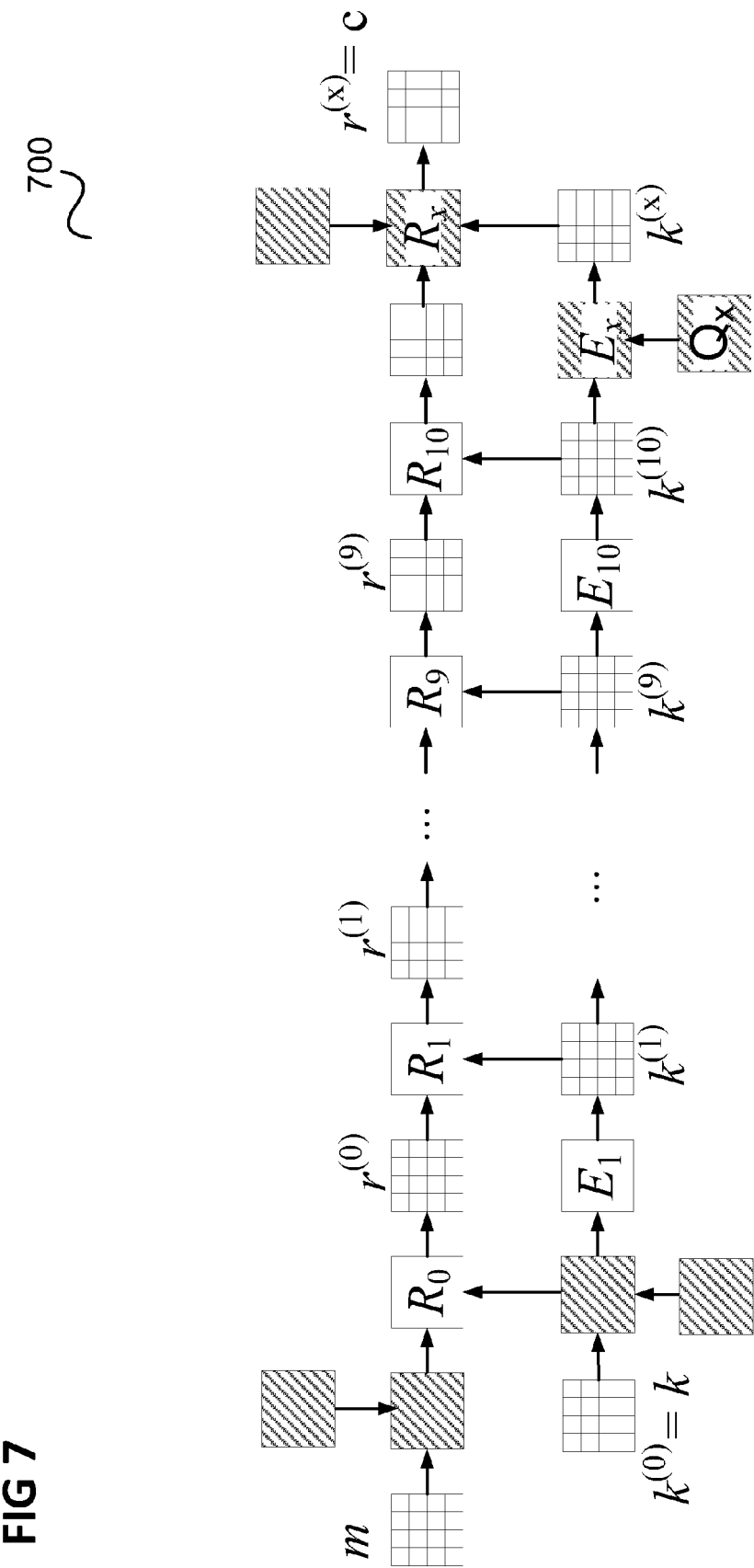
FIG. 7 shows an example where additional functions are only added at the end and the front of the block cipher and implemented using camouflage circuit technology.

FIG. 7 shows an example where additional functions are only added at the end and the front of the cryptographic algorithm and implemented using camouflage circuit technology.

Specifically, in this example only $V_0$ and $T_0$ of the example of FIG. 6 are added and an extra round $R_x$ is added which operates based on a key $k^{(x)}$ provided by an extra expansion function $E_x$ based on the key $k^{(10)}$.

The extra round $R_x$ and the extra key scheduling function $E_x$ may be identical with or different to the original rounds $R_j$ and $E_j$, respectively.

The block cipher may also be augmented only at its front or only at its end.

Compared to the approach illustrated in FIGS. 4 and 5 the added $V_0$ and $R_x$ are typically now critical with respect to side-channel attacks. Thus, it may for example be necessary to implement them with DPA countermeasures.

The approach illustrated above may also be applied to hash functions, MACs, or stream ciphers which show similar iterated structures like the block cipher examples above.

As mentioned above, the transformation functions $T_j$, $V_j$ may depend on additional keys $Q_j$, $S_j$ which are provided by circuitry which is implemented using circuit camouflage technology. In the following, examples are given how cryptographic keys used for example for block ciphers, stream ciphers, MACS, and other crypto algorithms may be efficiently and securely extracted, derived or generated using circuit camouflage technology. For example, a number of keys of relevant length, e.g. 64 bit, 80 bit, 128 bit or 256 bit should be provided. The number of keys should be e.g. 1, 2, 3 or even several 1000.

Figure 8:
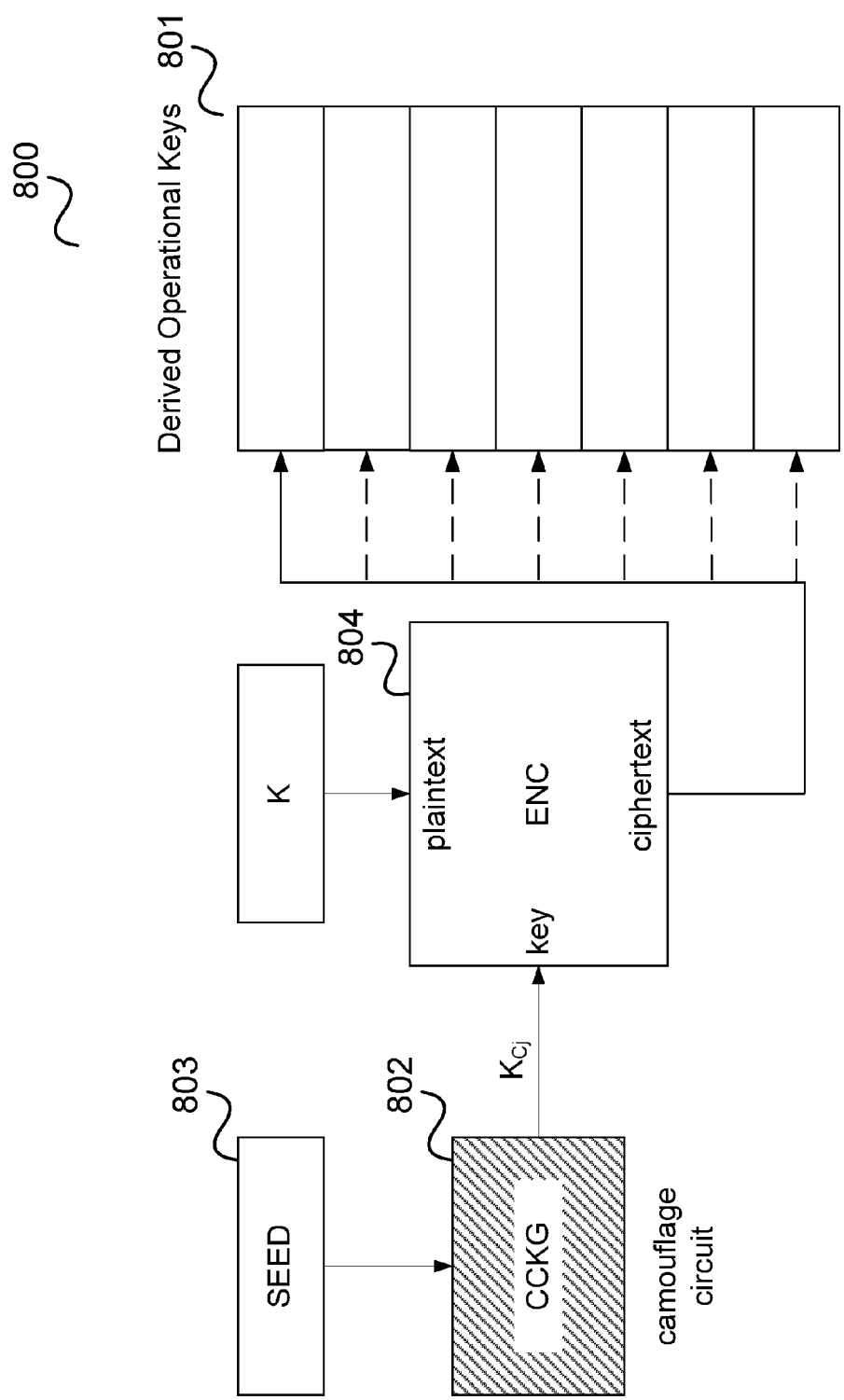
FIG. 8 shows an arrangement for generating a set of cryptographic keys.

FIG. 8 shows an arrangement 800 for generating a set of cryptographic keys 801.

The arrangement 800 includes a camouflage circuit protected key generator (CCKG) 802 which may for example obtain a seed value 803 as input and outputs a cryptographic key $K_{Cj}$. Different seeds may generate different key outputs $K_{Cj}$, for example such that the key values $K_{Cj}$ are not correlated. The key (also referred to as "camo key") $K_{Cj}$ is input to a key derivation block 804 which derives the operational keys 801 from a given application key k (which may for example be an ephemeral key from a key establishment protocol).

For the key derivation block 804, an encryption circuit may be used which generates the operational keys 801 by encrypting the key k based on one or more keys $K_{Cj}$. For example, the block cipher according to FIG. 5 or 6 (i.e. AES) may be used wherein the keys $K_{Cj}$ are used as the keys $Q_j$ or $S_j$, respectively.

It should be noted that in turn, the arrangement 800 may be used to generate keys for a block cipher as illustrated in FIGS. 5 and 6, i.e. the operational keys 801 may be used as the keys $Q_j$ or $S_j$.

An alternative simple key derivation algorithm performed by the key derivation block 804 could be to use a bitwise XOR-function to add (mask) the key K with $K_{Cj}$.

The key generator 802 is implemented using a camouflage circuit technology which hinders reverse engineering. Hence, an attacker who could obtain the application key k (e.g. from the secret key storage) is not able to predict the operational keys 801 because he cannot predict the $K_{Cj}$ from a reverse engineering of the key generator 802.

In the following, an embodiment is described in which as an example for a camouflage circuit technique dynamic camouflage cells are used, e.g. Indistinguishable yet Complementary Bit Cells (ICBC). An ICBC can be provided as one of two types, ICBC-1 and ICBC-0, generally abbreviated by ICBC-X. The ICBC-X is a gate that responds to an appropriate challenge (i.e. a predetermined input) by outputting a robust logical 1 (ICBC-1) or a robust logical 0 (ICBC-0), respectively, but cannot be distinguished by typical means of Reverse Engineering (RE) and other typical analysis methods of, i.e. attacks to, chip card controllers and security ICs.

The ICBC-X can be implemented with a physical design that is (sufficiently) symmetric in terms of its layout, i.e. its active regions, poly-silicon gates, contacts, metal connectivity etc. However, the ICBC-Xs has nMOS (n channel metal oxide semiconductor) and pMOS (p channel metal oxide semiconductor) components (generally field effect transistors) which have appropriately different threshold voltages (Vth) resulting in the robust transfer characteristics of the ICBC-X when challenged with an input pattern that would otherwise (i.e. in case of similar threshold voltages) correspond to a metastable state of the ICBC-X, i.e. a state in which the ICBC-X has no defined logic state.

Since in a typical manufacturing process, e.g. in a mixed-Vth scenario for a security IC, options for different threshold voltages such as "regular Vth" and "high Vth" are available, these can be used to realize the ICBC-X without a process change.

ICBC-1 and ICBC-0 are for example static CMOS (Complementary Metal Oxide Semiconductor) gates that can be implemented as elements of standard cell libraries.

The ICBC-X can for example be used as dynamical TIE-1 or TIE-0 cells, i.e. a TIE cell that can be switched between logically valid and invalid states, representing e.g. bits of a secret key or other pieces of confidential information.

Moreover, the ICBC-X can be combined with one or more logic gates to achieve reverse engineering resistant data paths and the ICBC-X can be concatenated to realize dynamical TIE tree structures.

The ICBC-X may further be applied to session key generation as well as address-dependent memory encryption configuration. In addition to that, after roll-out, i.e. after an ICBC-X's initial (e.g. random) configuration, the selected configuration can then be stored in a non-volatile memory for subsequent use. This may even allow for robust and reverse engineering resistant chip-individual pieces of information.

Since a multitude of ICBC-Xs can be distributed (e.g. irregularly) across an IC's entire semi-custom portion, and because these instances can be accessed in irregular, even random, temporal order, ICBC-Xs allow to tremendously increases the difficulty, risk and effort for all relevant security IC attack scenarios like reverse engineering, photon emission, laser voltage probing, etc.

The ICBC-X further provides dynamical, even chip individual characteristics in contrast to static camouflage techniques.

The ICBC-X concept can be seen to be based on resolving metastable states or metastable state transitions of (bistable) feedback circuitry by deploying (MOS) field effect transistors (in general switches) with different threshold voltages (in general state transition characteristics) in order to achieve robust ICBC-X state transitions, whereupon the nature of any given ICBC-X instance (X=1 or 0) remains concealed for an attacker employing relevant security IC attack scenarios like reverse engineering, photon emission, laser voltage probing, etc.

Figure 9:
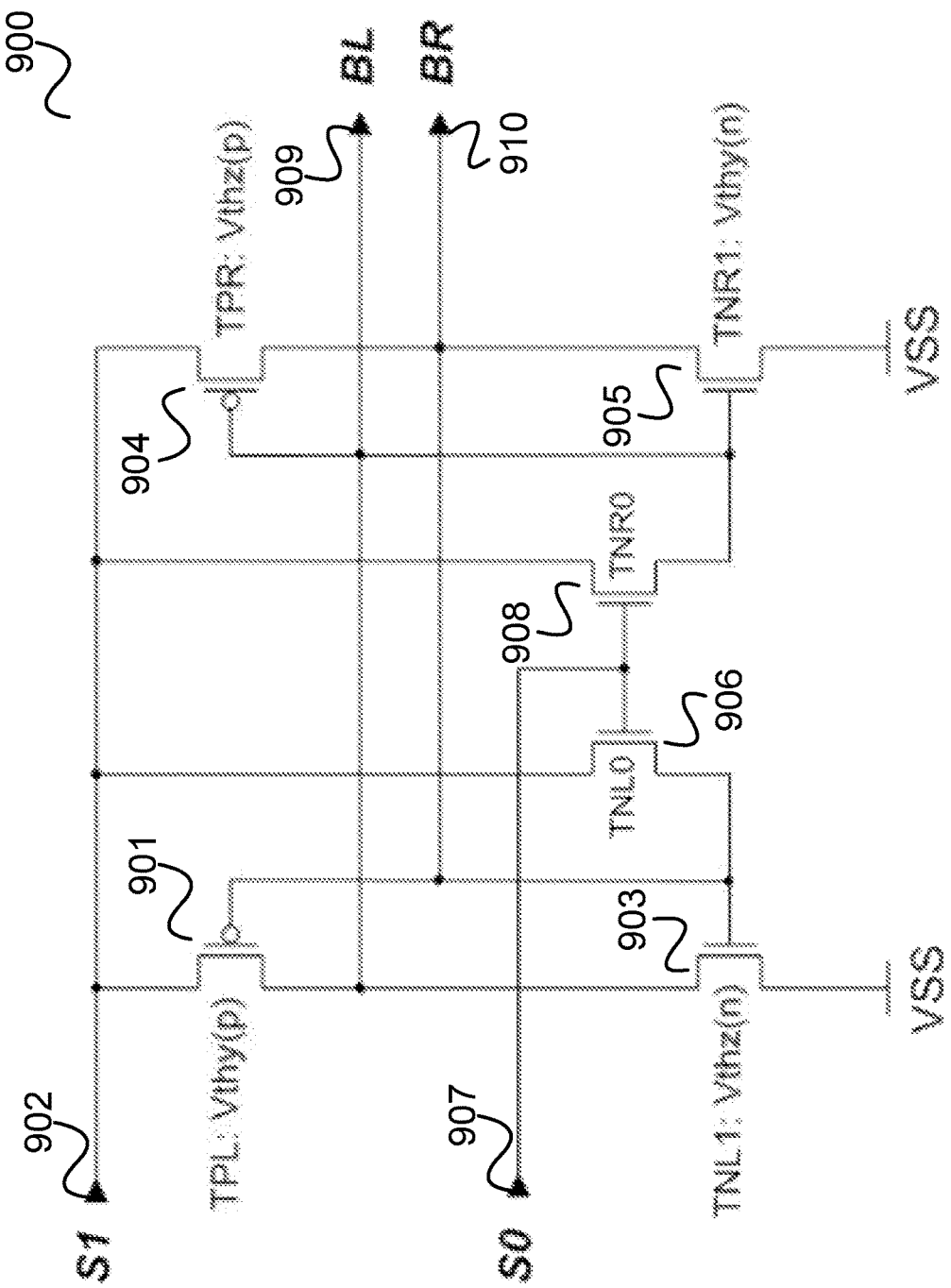
FIG. 9 shows an ICBC-X according to an embodiment.

An example for the circuitry schematic of an ICBC-X (X=0,1) is illustrated in FIG. 9.

FIG. 9 shows an ICBC-X 900 according to an embodiment.

The ICBC-X 900 includes a first p channel FET (field effect transistor) 901 whose source terminal is connected to a first input terminal 902 receiving an input signal S1, whose drain is connected to the drain terminal of a first n channel FET 903 and whose gate is connected to the gate of the first n channel FET 903. The source of the first n channel FET 903 is coupled to a low supply potential (VSS).

The ICBC-X 900 further includes a second p channel FET 904 whose source terminal is connected to the first input terminal 902, whose drain is connected to the drain terminal of a second n channel FET 905 and whose gate is connected to the gate of the second n channel FET 905. The source of the second n channel FET 905 is coupled to the low supply potential (VSS).

The gate of the first n channel FET 903 is further coupled to the source of a third n channel FET 906 whose drain is connected to the first input terminal 902 and whose gate is connected to a second input terminal 907 receiving an input signal S0.

The gate of the second n channel FET 905 is further coupled to the source of a fourth n channel FET 908 whose drain is connected to the first input terminal 902 and whose gate is connected to the second input terminal 907.

Further, the drain of the first p channel FET 901 is connected to the gate of the second p channel FET 904. This connection is further connected to a first output terminal 909 outputting an output signal BL.

Similarly, the drain of the second p channel FET 904 is connected to the gate of the first p channel FET 901 and this connection is further connected to a second output terminal 910 outputting an output signal BR.

Illustratively, the ICBC-X 900 has an internal feedback loop that is composed of the p channel FETs (e.g. pMOS transistors) 901, 904 and the first n channel FET 903 and the second n channel FET 905 (e.g. nMOS transistors) and which is enabled for S1=1 and disabled for S1=0, as well as precharge devices in the form of the third n channel FET 906 and the fourth n channel FET 908 (e.g. nMOS transistors) that are enabled for S0=1 and disabled for S0=0.

Figure 10:
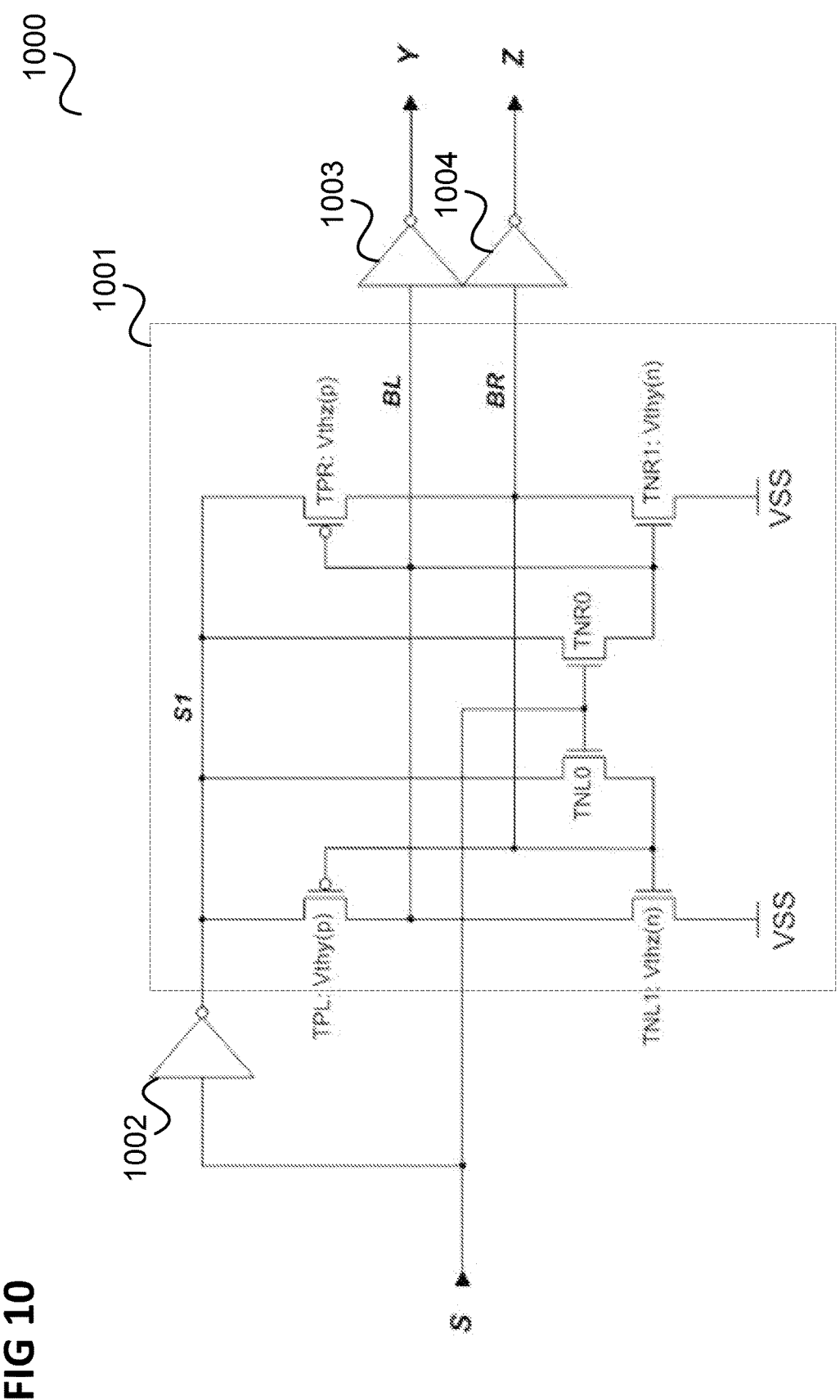
FIG. 10 shows an example of an ICBC-X standard cell.

FIG. 10 shows an example of an ICBC-X standard cell 1000.

The ICBC-X standard cell 1000 includes an ICBC-X 1001 as described above with reference to FIG. 9, wherein the input signal S1 is an input signal S inverted by a first inverter 1002, the input signal S0 is the input signal S, a first output signal Y is the output signal BL inverted by a second inverter 1003 and a second output signal Z is the output signal BR inverted by a third inverter 1004. Illustratively, the input signal S1 and the output signals BL and BR are buffered in order for the ICBC-X to be independent of input slope of S1 and output loads at BL and BR.

For the ICBC-1 case, i.e. for Vthz(p)>Vthy(p), Vthz(n)>Vthy(n), the cell 1000 (in this case an ICBC-1 cell) realizes the Boolean equations $Y=\overline{S},$ $Z=1,$ whereas for the ICBC-0 case, i.e. for Vthz(p)<Vthy(p), Vthz(n)<Vthy(n), $Y=1,$ $Z=\overline{S}.$ Thus, for the general ICBC-X case $Y=X\cdot\overline{S}+\overline{X}=\overline{S}+\overline{X},$ $Z=\overline{X}\cdot\overline{S}+X=\overline{S}+X.$ According to the ICBC-X cells as described above as an example, in the following dynamic camouflage cells are used which have (at least) one control input. When the control input is active such a cell yields an output value that cannot be predicted from reverse engineering of the cell. When the control input is inactive the output value may be some other value, which might be predictable from the reverse engineering. Hence such a cell can encode a secret Boolean value (one bit for the simplest version). In the following such a cell is referred to as magic hood cell.

Figure 11:
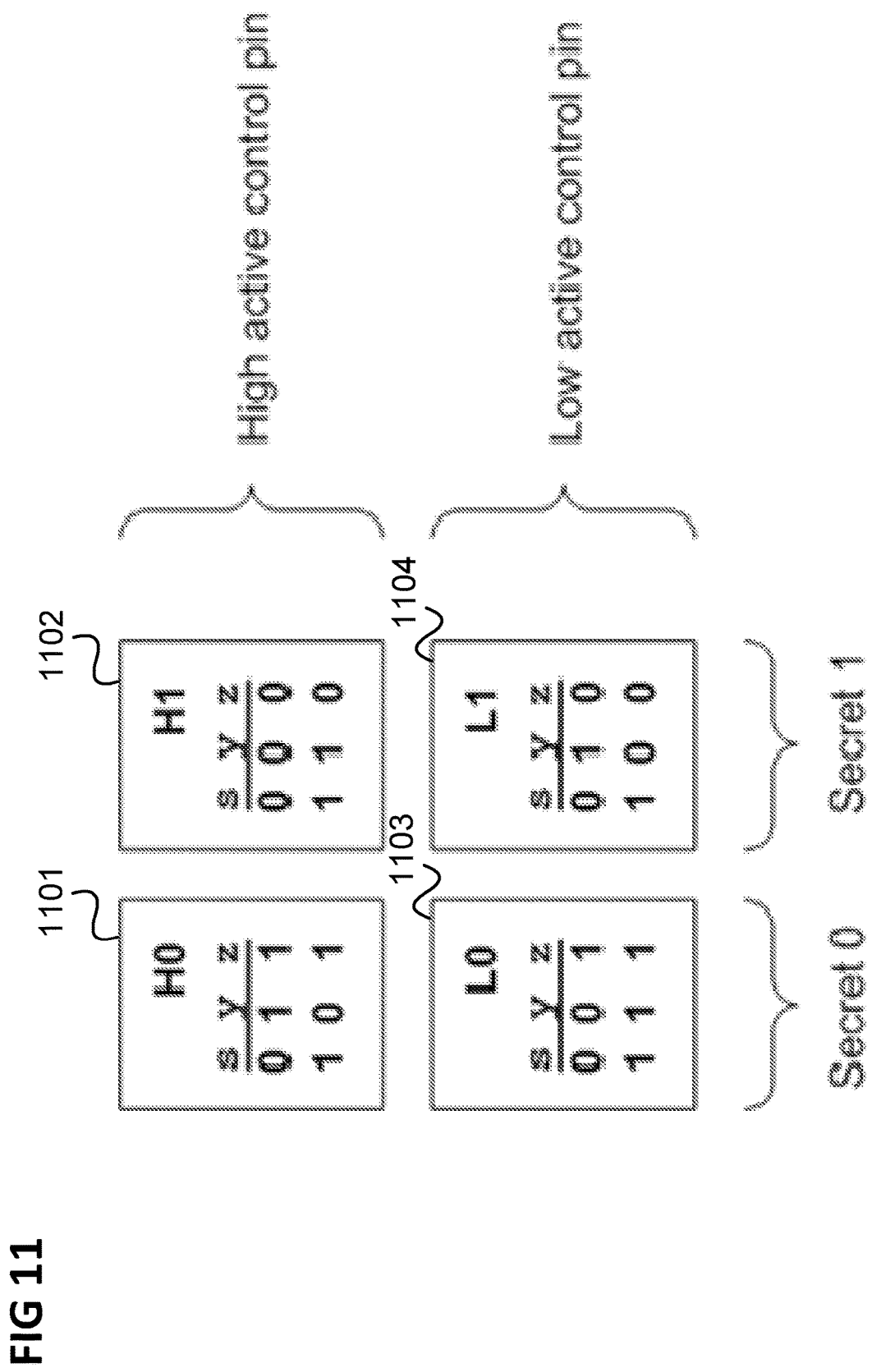
FIG. 11 shows tables illustrating the behavior of magic hood cells.

For example, magic hood cells like illustrated in FIG. 11 are used.

FIG. 11 shows four tables 1101 to 1104, each table illustrating the behavior of a magic hood cell in response to an input s.

Each cell has a secret value v (0 or 1) which it outputs at output The secret v is output at pin Y for active control signal S=1 (Hy type) and S=0 (Lv type), respectively. Pin Z outputs the fixed constant ¬v for any value of S.

According to one embodiment, a similar design for H0 and H1 is used such that they are indistinguishable (from their design) and they are used to occur approximately equally often. Then, also an attacker knowing the complementarity principle cannot deduce the secret value v of any individual cell. (The same holds for L0 and L1.)

For example, the ICBC-1 cell described above with reference to FIG. 10 is used as the magic hood cell H0 and the other magic hood cells are implemented based on variations of this cell (e.g. suitable change of the threshold voltage relations as described above, inversion of the input S, swapping of Y and Z etc.). In the following, an example of a key generation circuit 1200 is given based on the magic hood cells of FIG. 11.

Figure 12:
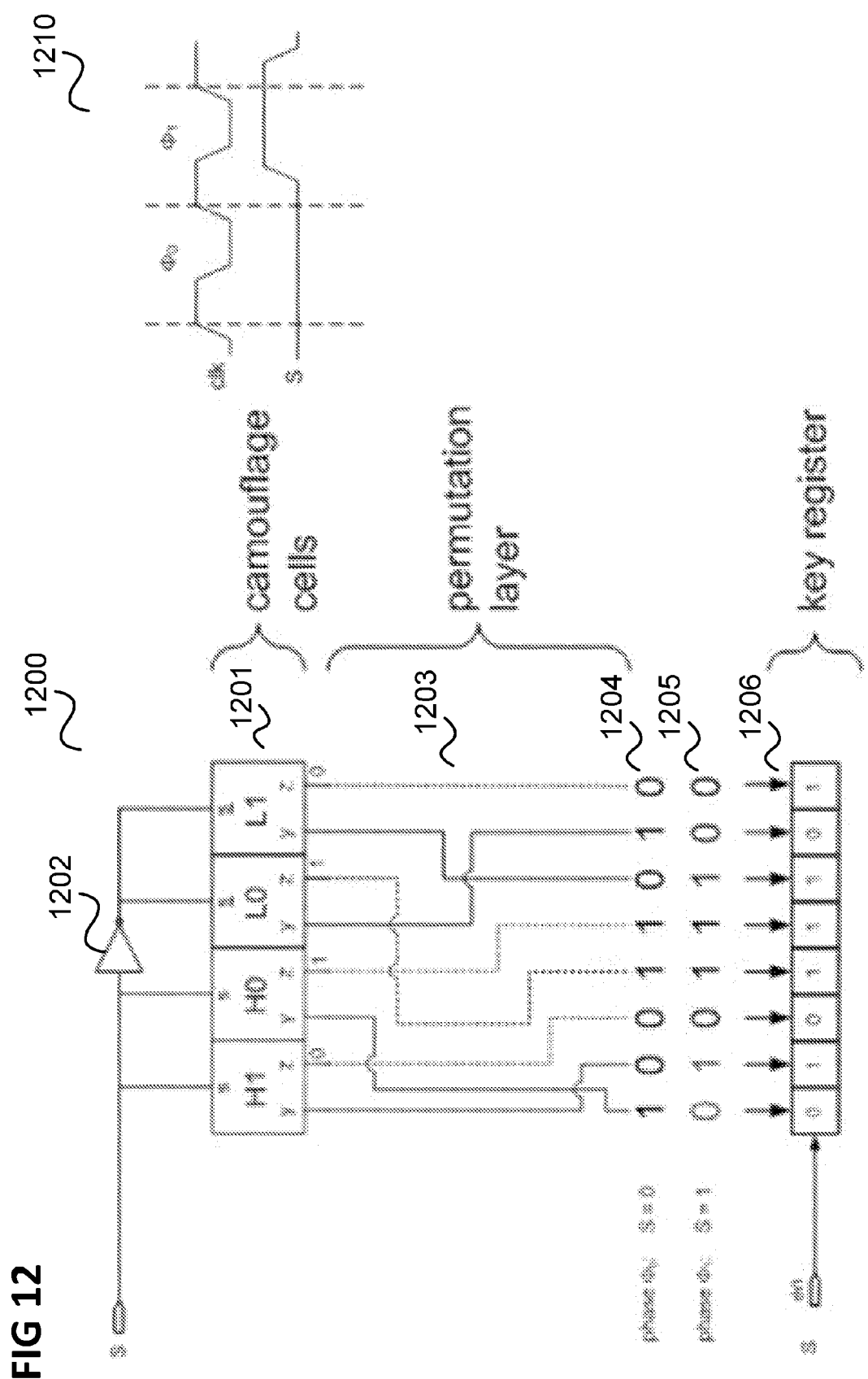
FIG. 12 shows a key generation circuit according to an embodiment.

FIG. 12 shows a key generation circuit 1200.

The key generation circuit 1200 may for example correspond to the key generation circuit 802 of the arrangement 800 in FIG. 8. However, instead of generating a key $K_{Cj}$ based on a seed, it generates a key in response to a control signal S based on the secret values of magic hood cells (or camouflage cells) 1201. The camouflage cells 1201 are of the types H1, H0, L1 and L0 with the behavior illustrated in FIG. 11.

The control signal S is inverted by an inverter 1202. As illustrated by signal diagram 1210, in a first phase $\Phi_0$ the control signal S is low which leads to the camouflage cells 1201 outputting values which are permuted by a permutation layer 1203 to give rise to a first vector 1204.

In a second phase $\Phi_1$ the control signal S is high which leads to the camouflage cells 1201 outputting values which are permuted by a permutation layer 1203 to give rise to a second vector 1205.

The second vector 1205 is stored as output key in a key register 1206. This may be implemented by using the control signal S as an enable signal for the key register 1206.

The fixed z-outputs of the camouflage cells 1201 are, as indicated by the broken lines of the permutation layer, used for fixed key bits, in this example for the third to fifth and eighth bit (from left to right) of the key, similar to the usage of tie cells for fixed outputs.

The dynamic y-outputs of the camouflage cells 1201 change from S=0 to S=1 and are latched in the key register 1206. After the storing, the control signal may again be switched to low (i.e. 0) to clear the secret bits again.

In this example, a number of n/2 camouflage cells is needed for an n bit key. For example, a 128-bit AES key stored according to the approach of FIG. 12 has 64 hard secret bits (i.e. bits that change value when the signal S changes). More than n/2 camouflage cells can be used to have a higher number of hard secret bits. The fixed z outputs may then for example be connected to other parts of the circuit.

The key generation circuit 1200 of FIG. 12 may be seen as a key generation circuit with a single level camouflage layer and dynamic activation at fixed time. In the following, an example for a key generation circuit with a single level camouflage layer and dynamic activation at different points in time is given.

Figure 13:
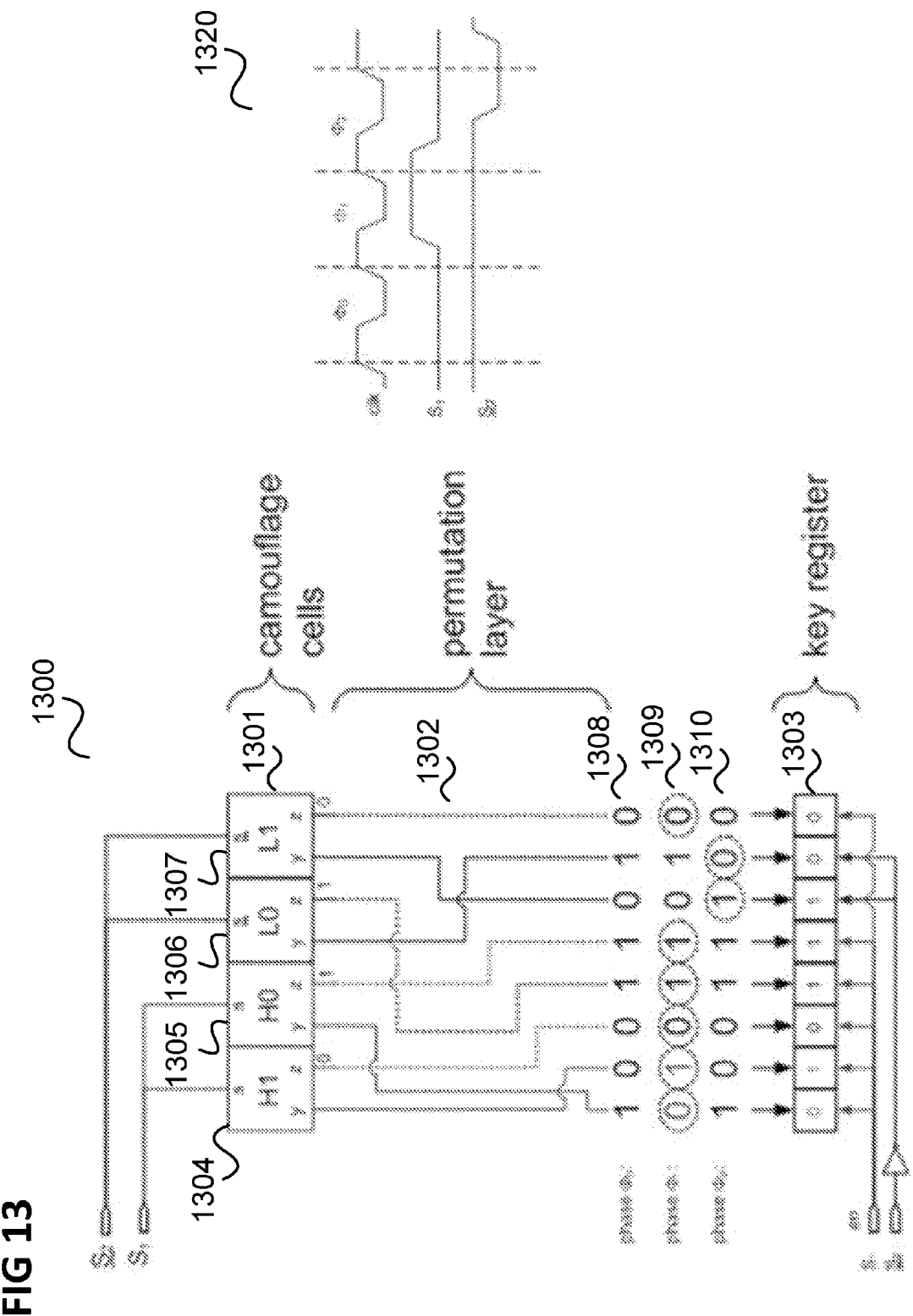
FIG. 13 shows a key generation circuit according to another embodiment.

FIG. 13 shows a key generation circuit 1300.

Similarly to the key generation circuit 1200, the key generation circuit 1300 includes camouflage cells 1301, a permutation layer 1302 and a key register 1303.

However, in this example, two different control signals S1 and S2 are used wherein S1 is supplied to the two left camouflage cells 1304, 1305 and S2 is supplied to the two right camouflage cells 1306, 1307.

As illustrated by the signal diagram 1320, the camouflage cells for different key portions are activated at different points in time (e.g. fixed random time). Namely, in a first phase $\Phi_0$ the control signal S1 is low and the control signal S2 is high which leads to the camouflage cells 1301 outputting values which are permuted by permutation layer 1302 to give rise to a first vector 1308.

In a second phase $\Phi_1$ both control signals S1 and S2 are high which leads to the camouflage cells 1301 outputting values which are permuted by the permutation layer 1303 to give rise to a second vector 1309.

In a third phase $\Phi_2$ control signal S1 is low and control signal S2 is low which leads to the camouflage cells 1301 outputting values which are permuted by the permutation layer 1303 to give rise to a third vector 1310 (it should be noted that the right camouflage cells 1306, 1305 have a low active control pin).

In other words, non-overlapping activation periods (i.e. S1 high, S2 low) are used for the camouflage cells 1301.

The latching of the key bits into the register 1303 is triggered at different points in time for the bits. Namely, key bits arising from the y outputs of the left camouflage cells 1304, 1305 are latched when the control signal S1 is high and key bits arising from the y outputs of the right camouflage cells 1306, 1305 are latched when control signal S2 is low.

The latching at different times provides an additional hurdle for an attacker (e.g. when trying to probe the values using needles on the wires).

In the following, an example for a key generation circuit with a multi-level camouflage layer and dynamic activation at different points in time is given.

Figure 14:
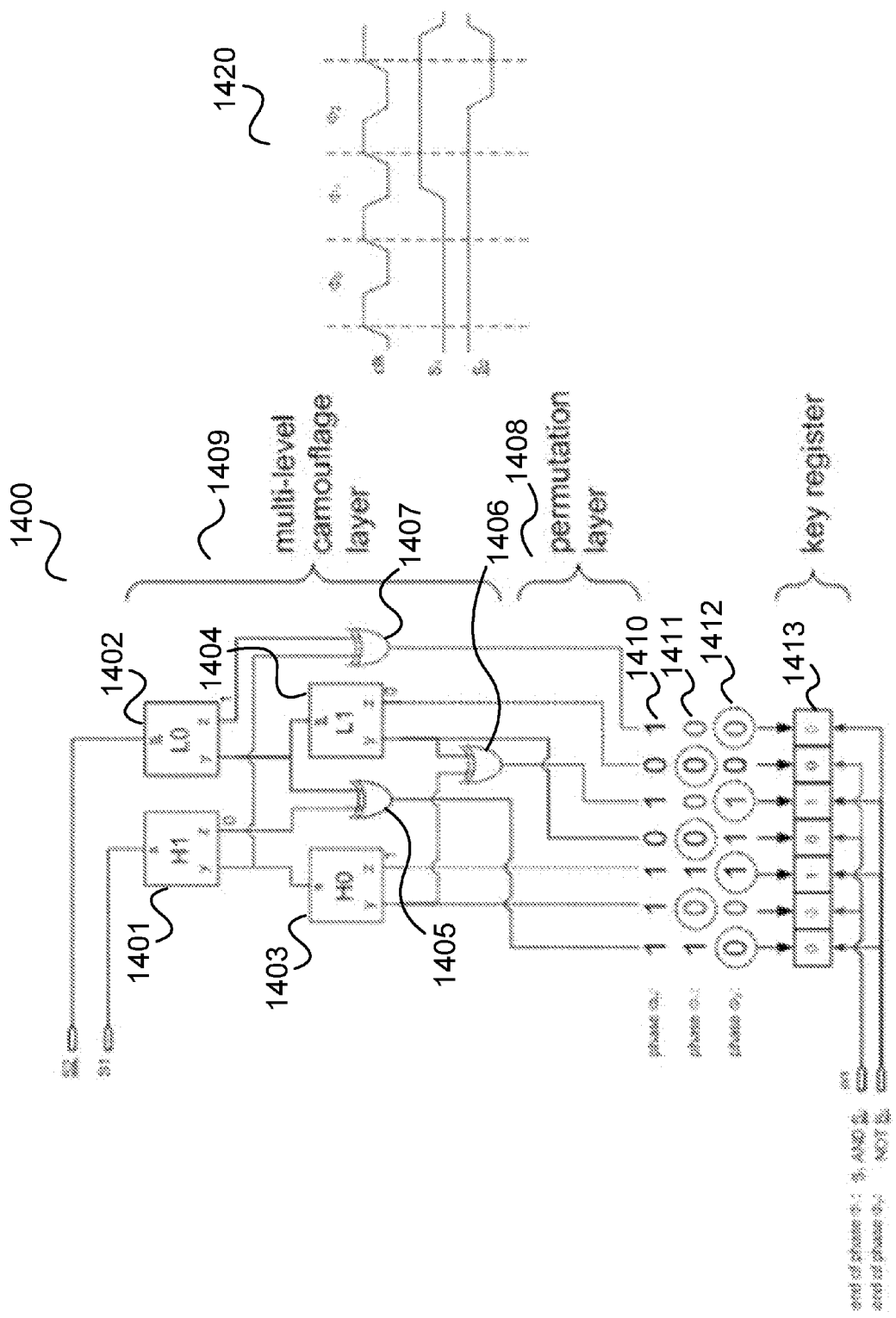
FIG. 14 shows a key generation circuit according to another embodiment.

FIG. 14 shows a key generation circuit 1400.

In this example, four camouflage cells 1401, 1402, 1403, 1404 are cascaded in a multi-level logic layer. Thus, an attacker needs to reverse engineer and probe more than one camouflage cell to obtain a single bit.

Specifically, a first camouflage cell 1401 receives a control signal $S_1$ and a second camouflage cell 1402 receives a control signal S2. The y output of the first camouflage cell 1401 is fed to the S input of a third camouflage cell 1403 and the y output of the second camouflage cell 1402 is fed to the S input of a fourth camouflage cell 1404. In other words, secret bits of the first layer of camouflage cells are used as control signal for the second layer of camouflage cells.

Further, XOR gates 1405, 1406, 1407 are used to combine secrets (i.e. y outputs) with static bits (i.e. z outputs) and secrets with secrets. Specifically, the z output of the first camouflage cell 1401 and the y output of the second camouflage cell 1402 are fed to a first XOR gate 1405. The y output of the third camouflage cell 1403 and the y output of the fourth camouflage cell 1404 are fed to a second XOR gate 1406. T y output of the first camouflage cell 1401 and the z output of the second camouflage cell 1402 are fed to a third XOR gate 1407.

A permutation layer 1408 distributes the outputs of the XOR gates 1405, 1406, 1407 and some of the y and z outputs of the camouflage cells 1401 to 1404 to the key bit positions.

The camouflage cells 1401 to 1404 together with the XOR gates 1405 to 1407 can be seen as multi-level camouflage layer 1409.

As illustrated by the signal diagram 1420, the camouflage cells for different key portions are activated at different points in time (e.g. fixed, random time). Namely, in a first phase $\Phi_0$ the control signals S1 is low and the control signal S2 is high which leads to the multi-level camouflage layer 1409 outputting values which are permuted by permutation layer 1408 to give rise to a first vector 1410.

In a second phase $\Phi_2$, S1 is high and S2 is high which leads to the multi-level camouflage layer 1409 outputting values which are permuted by the permutation layer 1408 to give rise to a third vector 1411.

In a third phase $\Phi_2$ control signal S1 is high and control signal S2 is low which leads to the multi-level camouflage layer 1409 outputting values which are permuted by the permutation layer 1408 to give rise to a third vector 1412.

In this example, in other words, the activation periods (S1 high, S2 low) of the camouflage cells 1401 to 1404 overlap.

The various phases $\Phi_1$, $\Phi_2$, $\Phi_3$ lead to a time varying sequence of the key bits as output by the permutation layer 1408.

The latching of the key bits into a key register 1413 is triggered at different points in time for (subsets of the key bits. Namely, with a numbering of the key bits from left to right of 0 to 6, bits 1, 3, 5 are latched at the end of phase $\Phi_1$ and bits 0, 2, 4 are latched at the end of phase $\Phi_2$. The values which are latched into the key register 1413 are encircled.

In the following, an example for a key generation circuit with a multi-level camouflage layer and dynamic activation and sequence property extraction is given.

Figure 15:
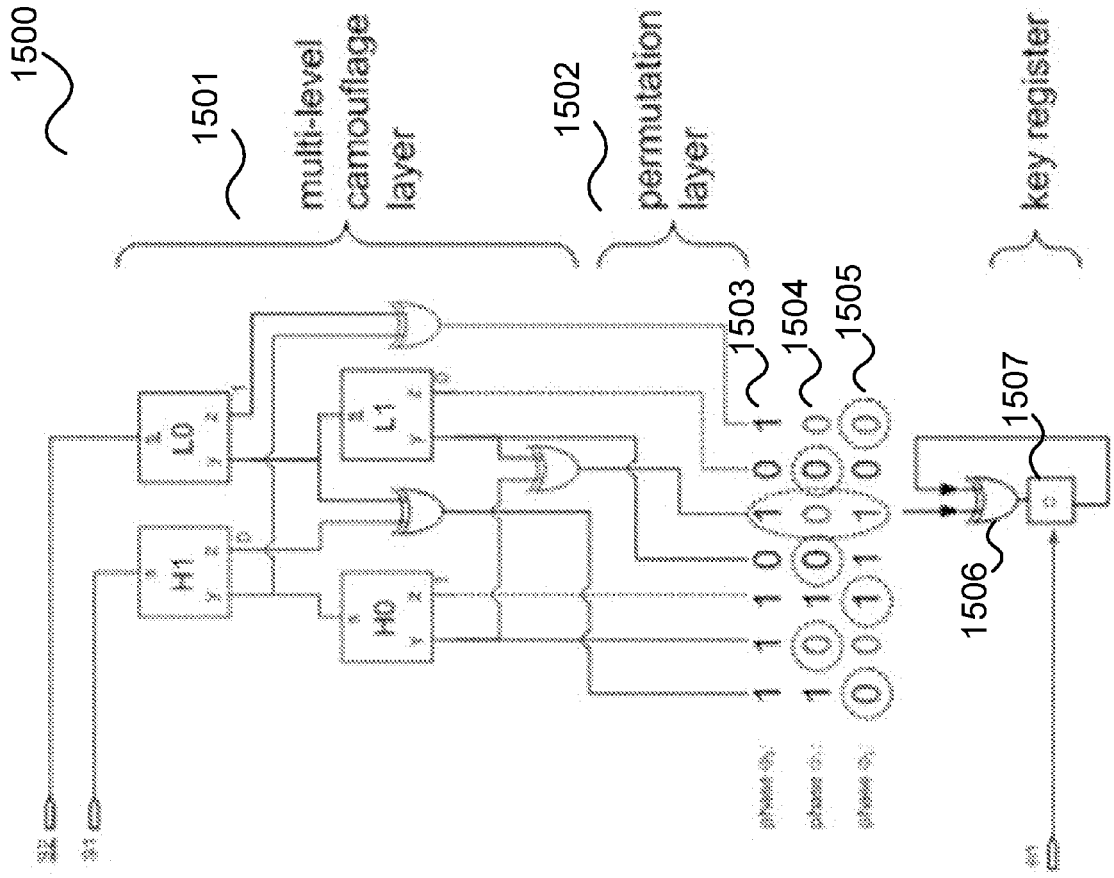
FIG. 15 shows a key generation circuit according to another embodiment.

FIG. 15 shows a key generation circuit 1500.

The key generation circuit 1500 has a multi-level camouflage layer 1501 which has the same structure as the multi-level camouflage layer 1409 of the key generation circuit 1400 and a permutation layer 1502 with the same structure as the permutation layer 1408 of the key generation circuit 1400.

Accordingly, there are output key vectors 1503, 1504, 1505 for the three phases $\Phi_1$, $\Phi_2$, $\Phi_3$.

In this example, one or more bits from the key vectors 1503, 1504, 1505 are combined before being latched in the key register.

For example, the fifth bit (bit 4) has three different values for the different activation phases, namely the sequence (1, 0, 1). To increase reverse engineering complexity, a certain property of this sequence can be extracted and used to generate a key bit. In this example, the sequence is summed modulo 2 by an XOR gate 1506 and a key bit latch 1507 such that at the end, the key bit latch 1507 holds the parity of the sequence. The key bit latch 1507 is enables by an en(able) signal which is assumed to be active over the three cycles, i.e. the activation phases.

Further, bits taken from different positions in the key vectors and from different key vectors can be combined to generate key bits.

In the following, an example for a key generation circuit for multiple key generation with a multi-level camouflage layer and dynamic activation is given.

Figure 16:
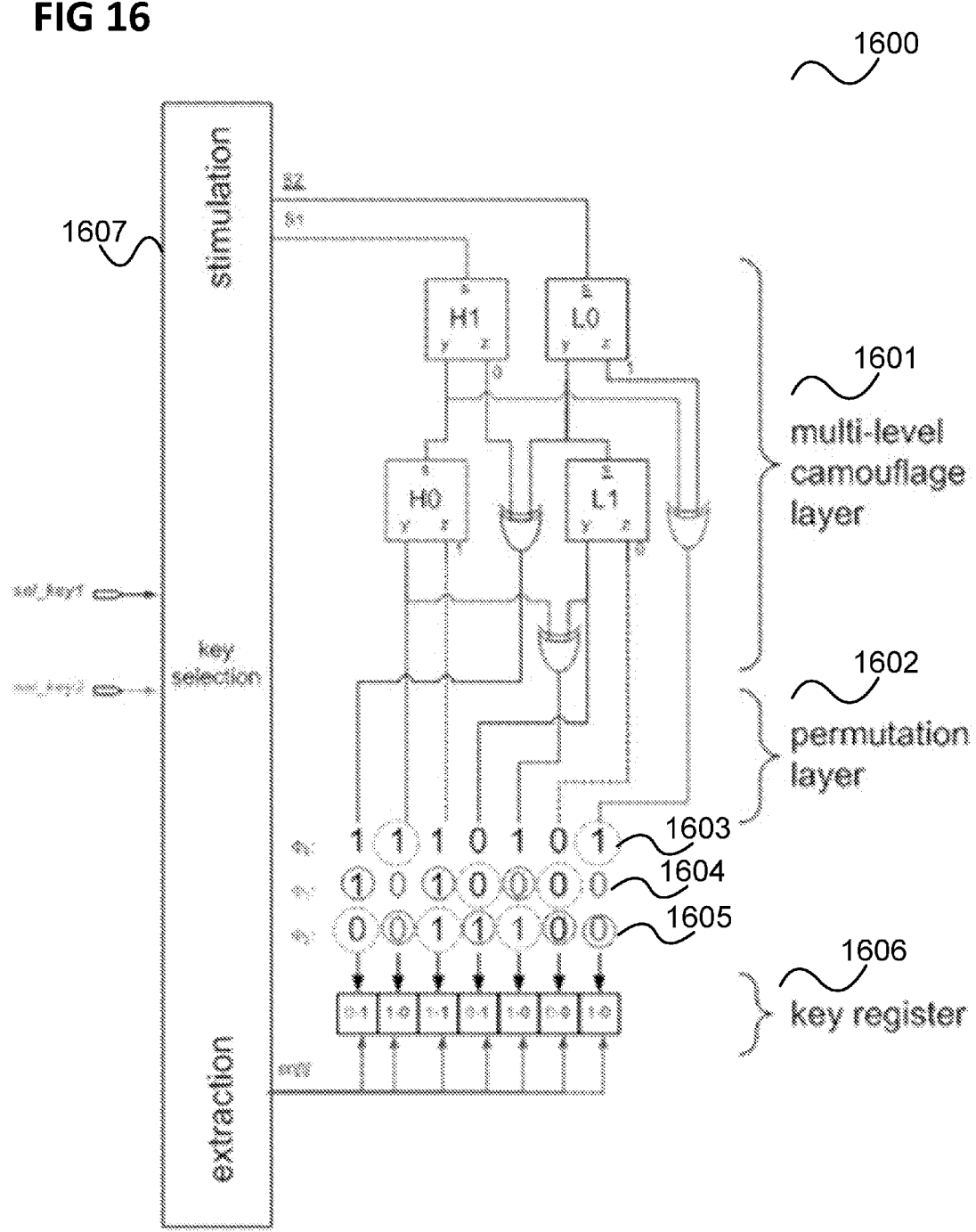
FIG. 16 shows a key generation circuit according to another embodiment.

FIG. 16 shows a key generation circuit 1600.

The key generation circuit 1600 has a multi-level camouflage layer 1601 which has the same structure as the multi-level camouflage layer 1409 of the key generation circuit 1400 and a permutation layer 1602 with the same structure as the permutation layer 1408 of the key generation circuit 1400.

Accordingly, there are output key vectors 1603, 1604, 1605 for the three phases $\Phi_1$, $\Phi_2$, $\Phi_3$.

The key generation circuit 1600 further includes a key register 1606 with a latch for each of seven key bits.

Further, the key generation circuit 1600 includes a key selection circuit 1607 which outputs the control signal S1 and S2 and which, in response to a selection signal sel_key1 (to generate a first key) and in response to a selection signal sel_key2 (to generate a second key) enables the key latches to store respective bits of the key vectors 1603, 1604, 1605 wherein the key selection circuit 1607 enables the latches differently for the first key and the second key to generate two different keys.

For example, the key selection circuit 1607 selects the solid encircled key vector bits for the first key (noted to the right in each latch) and the dashed encircled key vector bits for the second key (noted to the left in each latch).

Thus, multiple pairwise different keys (in this example two keys) are extracted by assigning the bits of the output bit sequences of the camouflage layer 1601, taken at different phases $\Phi_0$, $\Phi_1$, . . . (which can be extended to more than three phases) to different keys.

More generally, the key selection circuit 1607 may have input signals sel_key[m] to select one out of m keys and enables the latching of selected output bits of the camouflage layer 1601 at certain points in time.

The selection algorithm according to which the key selection circuit 1607 determines which latches to enable may be chosen such that the bits of the m keys are not correlated and that each key contains a minimum number k of secret bits. For this, the multi-level camouflage layer 1601 may be designed to have at least m*k camouflage cells. Further, the number of activation phases is chosen sufficiently high (related to the depth of the multi-level camouflage cell layer).

Figure 17:
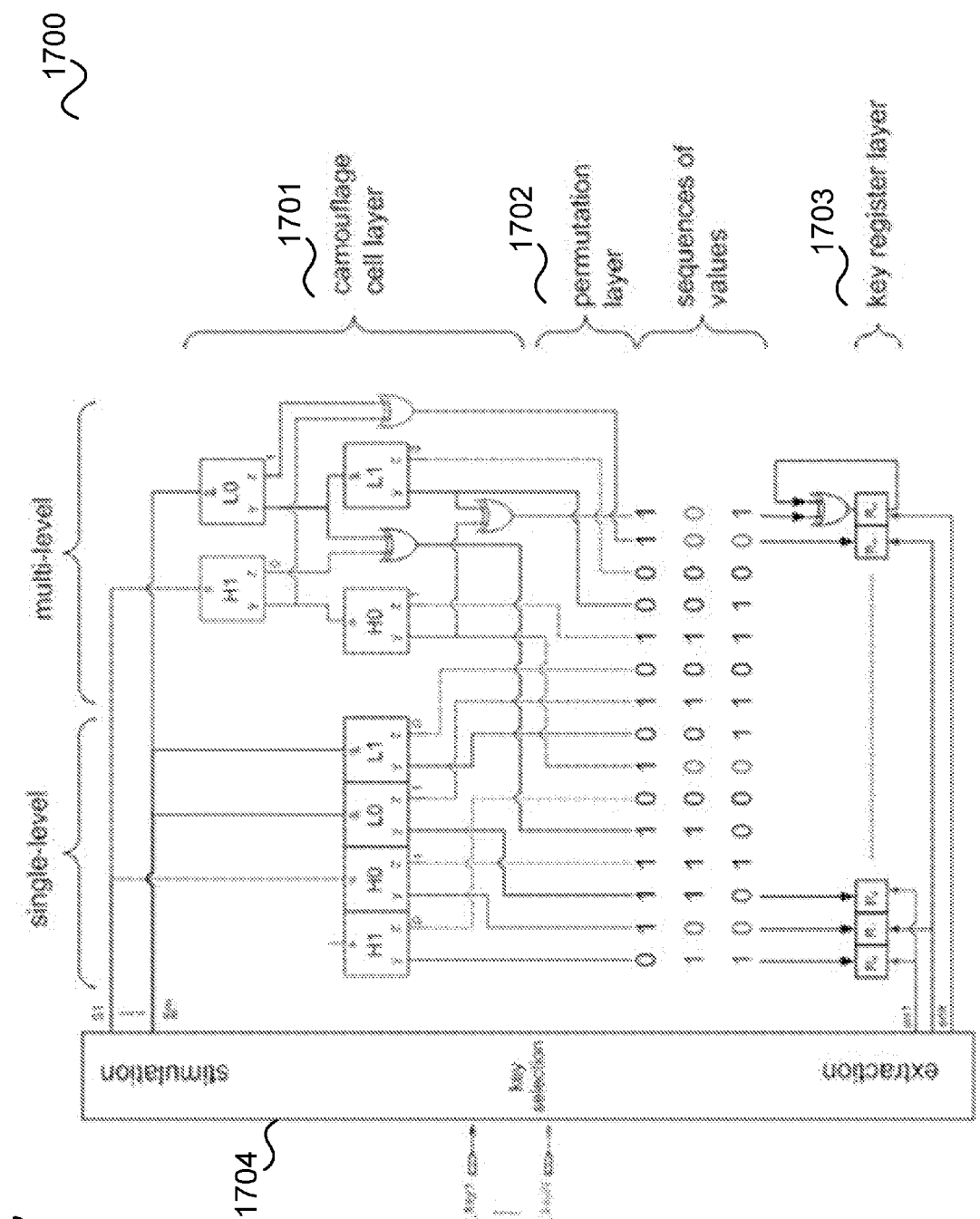
FIG. 17 shows a key generation circuit illustrating a combination of the examples of FIGS. 13 to 16.

FIG. 17 shows a key generation circuit 1700 illustrating a combination of the examples of FIGS. 13 to 16.

The key generation circuit 1700 includes a camouflage cell layer 1701 which includes a camouflage cell layer similar to the one of key generation circuit 1300 and a multi-level camouflage cell layer similar to the one of key generation circuit 1400. The key generation circuit 1700 further includes a permutation layer 1702 and a key register layer 1703 including a key register with a latch for each key bit wherein in this example, for the n-th bit, a sequence property extraction is provided as in the key generation circuit 1500.

The key generation circuit 1700 further includes a key selection circuit 1704 allowing the extraction of N different keys as explained with reference to the key generation circuit 1600.

In general, a key generation circuit according to various embodiments, e.g. used as camouflage cell key generation module CCKG includes the following components:

1. Camouflage cell layer
2. Permutation layer
3. Key extraction logic
4. Key register layer According to one embodiment, a key generation circuit is provided as illustrated in FIG. 18.

Figure 18:
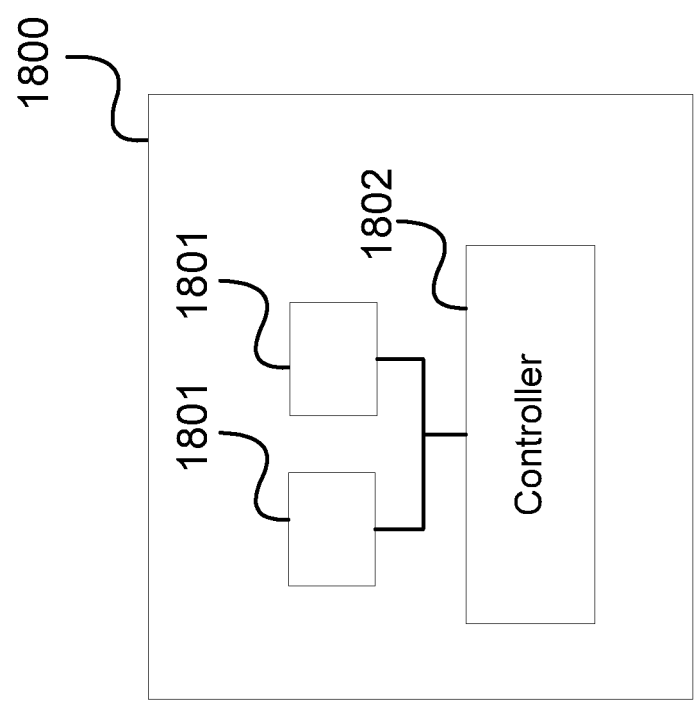
FIG. 18 shows a key generation circuit according to one embodiment.

FIG. 18 shows a key generation circuit 1800 according to one embodiment.

The key generation circuit 1800 includes a plurality of circuits 1801, wherein each circuit 1801 is configured to output a respective predetermined output value in response to a respective predetermined input and wherein the plurality of circuits 1801 are implemented using a circuit camouflage technique.

The key generation circuit 1800 further includes a controller 1802 configured to supply, for each circuit of the plurality of circuits 1801, the predetermined input to the circuit and to derive a cryptographic key from the output values of the circuits 1801.

In other words, a controller generates a key based on the output of a plurality of camouflaged cells wherein each cell has a certain predetermined output in response to its input, i.e. each cell can be seen to store a certain value (e.g. a bit).

The predetermined output value (of a circuit or cell) is for example an output bit (of the circuit or cell).

According to one embodiment, the derivation of the key from the outputs includes a permutation of the output values of the circuits.

According to one embodiment, the derivation of the key from the output includes a Boolean combination of the output values.

The controller may for example be configured to supply the input signals to at least two of the circuits at different time periods.

Each circuit is for example configured to output a further predetermined output value when the circuit is not supplied with the predetermined input.

According to one embodiment, the controller is configured to derive the cryptographic key from the output values of the circuits and at least a part of the further output values of the circuits.

It should be noted that embodiments described in context with the key generation circuit are analogously valid for the processing circuit of FIG. 1 and the method of FIG. 2 and vice versa.

Further, it should be noted that analogously to the method illustrated in FIG. 2, a method for implementing a key generation circuit according to FIG. 18 may be provided.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A cryptographic processor comprising:
   a processing circuit configured to perform a round function of an iterated cryptographic algorithm;
   a controller configured to control the processing circuit to apply a plurality of iterations of the round function on a message to process the message in accordance with the iterated cryptographic algorithm;
   a transformation circuit configured to transform the input of a second iteration of the round function following a first iteration of the round function of the plurality of iterations and to supply the transformed input as input to the second iteration;
   wherein the transformation circuit comprises one or more cells having an internal feedback loop configured to have a fixed output and a dynamic output.

2. The cryptographic processor according to claim 1, wherein the iterated cryptographic algorithm is an iterated encryption algorithm or an iterated decryption algorithm or an iterated hash construction.

3. The cryptographic processor according to claim 1, wherein the iterated cryptographic algorithm is an iterated block cipher algorithm for encryption or decryption.

4. The cryptographic processor according to claim 1, wherein the input of the second iteration is the intermediate state of a message processed by the first iteration.

5. The cryptographic processor according to claim 1, wherein the input of the second iteration is a cryptographic key for encrypting or decrypting a message.

6. The cryptographic processor according to claim 1, wherein the transformation circuit is configured to transform the input of each of a plurality of iterations of the round function following the first iteration and to supply the transformed input as input to the second iteration.

7. The cryptographic processor according to claim 1, wherein the transformation circuit being implemented using a circuit camouflage technique comprises the transformation circuit being implemented to include at least one circuit structure with a hidden logic function.

8. The cryptographic processor according to claim 1, wherein the transformation circuit being implemented using a circuit camouflage technique comprises the transformation circuit being implemented to include circuit structures to hamper reverse engineering of the transformation circuit.

9. The cryptographic processor according to claim 1, wherein the transformation circuit being implemented using a circuit camouflage technique comprises the transformation circuit being implemented to include at least one dummy circuit structure.

10. The cryptographic processor according to claim 9, wherein the transformation of the input of the second iteration is independent from the logic state of the dummy circuit structure.

11. The cryptographic processor according to claim 1, wherein the transformation circuit being implemented using a circuit camouflage technique comprises the transformation circuit being implemented to include a circuit structure which comprises one or more switching elements but has an output with a logic value that is independent from the input of the second iteration.

12. The cryptographic processor according to claim 1, wherein the transformation circuit being implemented using a circuit camouflage technique comprises the transformation circuit being implemented to include a sub-circuit comprising
at least one p channel field effect transistor;
at least one n channel field effect transistor;
a first power supply terminal configured to receive a first supply voltage with an upper supply potential; and
a second power supply terminal configured to receive a second supply voltage with a lower supply potential;
wherein the at least one p channel field effect transistor and the at least one n channel field effect transistor are connected such that
the at least one n channel field effect transistor, if supplied with the upper supply potential at its gate, supplies the lower supply potential to the gate of the at least one p channel field effect transistor; and
the at least one p channel field effect transistor, if supplied with the lower supply potential at its gate, supplies the upper supply potential to the gate of the at least one n channel field effect transistor;
wherein the sub-circuit is configured such that the logic state of the gate of the at least one p channel field effect transistor and the logic state of the gate of the at least one n channel field effect transistor can only be changed by changing a supply of at least one of the first supply voltage and the second supply voltage to the sub-circuit; and
a connection coupled to the gate of the at least one p channel field effect transistor or the gate of the at least one n channel field effect transistor and a further component of the transformation circuit.

13. The cryptographic processor according to claim 1, wherein the transformation circuit being implemented using a circuit camouflage technique comprises the transformation circuit being implemented to include a sub-circuit comprising
a plurality of supply lines delimiting a plurality of cell areas; and
a gate comprising a first transistor and a second transistor, wherein the first transistor is located in a first cell area of the plurality of cell areas and the second transistor is located in a second cell area of the plurality of cell areas such that a supply line of the plurality of supply lines lies between the first cell area and the second cell area.

14. A method for implementing a cryptographic processor comprising:
forming a processing circuit configured to perform a round function of an iterated cryptographic algorithm;
forming a controller configured to control the processing circuit to apply a plurality of iterations of the round function on a message to process the message in accordance with the iterated cryptographic algorithm;
forming a transformation circuit configured to transform the input of a second iteration of the round function following a first iteration of the round function of the plurality of iterations and to supply the transformed input as input to the second iteration;
wherein the transformation circuit comprises one or more cells having an internal feedback loop configured to have a fixed output and a dynamic output.

15. A key generation circuit comprising
a plurality of circuits, wherein each circuit is configured to output a respective predetermined output value in response to a respective predetermined input and wherein at least one circuit comprises one or more cells having an internal feedback loop configured to have a fixed output and a dynamic output; and
a controller configured to supply, for each circuit of the plurality of circuits, the predetermined input to the circuit and to derive a cryptographic key from the output values of the circuits.

16. The key generation circuit according to claim 15, wherein the predetermined output value is an output bit.

17. The key generation circuit according to claim 15, wherein the derivation of the key from the outputs comprises a permutation of the output values of the circuits.

18. The key generation circuit according to claim 15, wherein the derivation of the key from the output comprises a Boolean combination of the output values.

19. The key generation circuit according to claim 15, wherein the controller is configured to supply the input signals to at least two of the circuits at different time periods.

20. The key generation circuit according to claim 15, wherein each circuit is configured to output a further predetermined output value when the circuit is not supplied with the predetermined input.

21. The key generation circuit according to claim 15, wherein the controller is configured to derive the cryptographic key from the output values of the circuits and at least a part of the further output values of the circuits.

22. The cryptographic processor of claim 1, wherein the transformation circuit is implemented using a circuit camouflage technique selected from the group consisting of:
  the transformation circuit comprising a field effect transistor configured to have a constant switch state;
  the transformation circuit comprising a hidden connection in a diffusion layer or a polysilicon layer;
  the transformation circuit comprising cells with different logic functions but similar layout; and
  the transformation circuit comprising at least two field effect transistors connected such that in response to a predetermined input the circuit has an undefined logic state when the threshold voltages of the at least two field effect transistors are equal and such that the output is predetermined when the threshold voltages of the at least two field effect transistors are different.

23. The cryptographic processor of claim 1, wherein the one or more cells comprise an indistinguishable complementary bit (ICBC-X) cell; and wherein the ICBC-X cell comprises the feedback loop.

24. The cryptographic processor of claim 23, wherein the ICBC-X cell is symmetric.

* * * * *